United States Patent
Reiners

(10) Patent No.: US 12,012,929 B2
(45) Date of Patent: Jun. 18, 2024

(54) KITE CONTROL SYSTEM

(71) Applicant: OCEANERGY AG, Berlin (DE)

(72) Inventor: Wolfram Johannes Bernd Reiners, Cape Town (ZA)

(73) Assignee: OCEANERGY AG, Stuttgart (DE)

( * ) Notice: Subject to any disclaimer, the term of this patent is extended or adjusted under 35 U.S.C. 154(b) by 223 days.

(21) Appl. No.: 17/436,421

(22) PCT Filed: Mar. 6, 2020

(86) PCT No.: PCT/IB2020/051949
§ 371 (c)(1),
(2) Date: Sep. 3, 2021

(87) PCT Pub. No.: WO2020/183313
PCT Pub. Date: Sep. 17, 2020

(65) Prior Publication Data
US 2022/0128027 A1    Apr. 28, 2022

(30) Foreign Application Priority Data
Mar. 8, 2019  (GB) ..................... 1903146

(51) Int. Cl.
*F03D 5/00* (2006.01)
*B64C 31/06* (2020.01)

(52) U.S. Cl.
CPC ............. *F03D 5/00* (2013.01); *B64C 31/06* (2013.01); *F05B 2240/9172* (2020.08)

(58) Field of Classification Search
CPC ... F03D 5/00; F03D 5/005; F03D 5/02; F03D 5/04; F03D 5/06; F05B 2240/9172;
(Continued)

(56) References Cited

U.S. PATENT DOCUMENTS

2002/0040948 A1*  4/2002  Ragner ............... F03D 5/06
                                            244/153 R
2005/0040291 A1*  2/2005  Hansel ............... B63H 8/58
                                            244/155 A
(Continued)

FOREIGN PATENT DOCUMENTS

WO    2011/121557 A2    10/2011
WO    2013/147600 A2    10/2013

OTHER PUBLICATIONS

'Hydraulic_Cylinder'. Wikipedia [online]. 2015, [retrieved on Jun. 16, 2023]. Retrieved from the Internet: <URL:https://web.archive.org/web/20150618160656/https://en.wikipedia.org/wiki/Hydraulic_cylinder> (Year: 2015).*

(Continued)

*Primary Examiner* — Elton K Wong
(74) *Attorney, Agent, or Firm* — Renner, Kenner; Arthur M. Reginelli

(57) ABSTRACT

A kite control system for controlling a kite which includes a plurality of rotators, a plurality of guiding elements locatable between each of the plurality of rotators and the kite, a plurality of adjustable deflectors, a plurality of deflector guides configured to adjust the operational length of the kite connecting line upon adjustment of the deflector, at least one invert correlator for, when in use, inversely correlate the adjustment of the operative length of the respective kite connecting lines, wherein the plurality of kite connecting lines includes the connection of at least one of the kite connecting lines at the kite biased towards the leading end region of the kite, and the connection of at least another kite connecting line biased towards the trailing end region of the kite.

26 Claims, 27 Drawing Sheets

(58) Field of Classification Search
CPC ..... F05B 2240/9174; F05B 2240/9176; B63H 9/072; B63H 8/16; B64C 31/06
See application file for complete search history.

(56) References Cited

U.S. PATENT DOCUMENTS

| | | | |
|---|---|---|---|
| 2009/0083956 A1* | 4/2009 | Ulfik | G01L 5/047 24/68 D |
| 2013/0078097 A1* | 3/2013 | Milanese | F03D 7/00 416/170 R |
| 2015/0048621 A1 | 2/2015 | Smeenk et al. | |
| 2016/0135908 A1* | 5/2016 | Takahashi | A61B 34/71 606/130 |
| 2016/0159448 A1* | 6/2016 | Reiners | B63H 9/072 114/102.16 |
| 2021/0253210 A1* | 8/2021 | Arrouy | B63H 9/072 |

OTHER PUBLICATIONS

International Search Report and Written Opinion dated Aug. 13, 2020 for corresponding PCT/IB2020/051949 (12 pps).

* cited by examiner

KITE CONTROL SYSTEM

TECHNICAL FIELD OF THE INVENTION

This invention relates to a kite control system.

BACKGROUND TO THE INVENTION

The Applicant is aware of several watercraft-based and land-based arrangements, mechanisms, or systems for controlling kites and similar airborne devices.

Some of these systems use steering actuators at hard wings or semi-rigid wings which are directly located at the wing which allows a user to steer this kind of kite in the same way as one would steer an airplane.

Several other systems are known with a kite steering unit in a "gondola", which is suspended in the air and beneath the wing. With such systems, often used for soft kites made from fabric, and also for inflatable kites, a single traction rope connects the gondola to the ground or to the deck of a watercraft. Some of the prior art systems foresee potential failure of the kite control unit in the remote-controlled gondola and also incorporate emergency controllers, which automatically engage upon failure.

Other kite steering systems use a pair of kite connecting cables connected to the ground or to a watercraft and leading to a kite. These cables are typically rolled up on a pair of winches, which are located on ground level. In this instance the kite is controlled by manipulating the winches separate from one another, often by use of electric motors. The winches can also function as electrical generators or they may have electrical generators connected to it. In these systems the cables are functioning both as traction ropes and as a means to control the kite.

Other systems use three, four, or more ropes. These are controlled by reels or winches, which receive input from a pilot system, which can be hand-controlled by a human pilot or by a computer. These kinds of kite control systems are designed to control the kite more effectively in difficult flight circumstances and conditions and to fly the kite most effectively with maximum power output.

When using winches not only to reel-out the ropes in order to move the kite high up into the sky and to reel-in the ropes to move the wing down, or to prepare the kite for landing, but also to change the geometry of the kite in the air, for example to change the wind angle of attack (to "power" or "de-power" the kite) or to steer the kite left and right, these winches need to be constantly in operation.

This imposes specific requirements on the mechanical specifications of the winches, as the winches not only have to be controlled separately, constantly but also in a synchronized manner, exerting high rotational forces. Therefore, some kite control systems have been described wherein the function of the reels to roll-up the kite lines are de-coupled from the function to manipulate the operational length of the lines to the wind collecting canopy, for the purpose of steering the kite to the left and to the right.

These systems control the kite by manipulating the length of lines differentially by means of pullies, having the kite connecting lines guided therethrough and which are further movable relative one another. Some of these systems describe how to steer even a plurality of kites, in order to increase power, and others describe how driving systems can be efficiently applied for the reels and the pullies. Most of these systems are not suitable to efficiently control very large kites in strong winds, which results in high traction forces on the kite connecting lines.

For the purpose of this specification the term "kite" shall mean to include a wing, a sail, an airfoil, a wing profile, a glider, a paraglider, a parakite, and any other similar wind engagement element capable of being lifted aerodynamically by the wind, and connected to the ground.

SUMMARY OF INVENTION

According to the invention there is provided a kite control system for controlling a kite which includes:

a plurality of rotators interconnectable to one or more of a plurality of kite connecting lines for adjusting the operational length of the one or more kite connecting lines upon rotation thereof, when in use;

a plurality of guiding elements locatable between each of the plurality of rotators and the kite for guiding and defining a kite line path for each of the plurality of kite connecting lines from the rotators towards the kite;

a plurality of adjustable deflectors, at least one of which is locatable inbetween at least one of the plurality of rotators and the kite;

a plurality of deflector guides, each of which is operatively connected to at least one of the plurality of deflectors, and having at least one of the plurality of kite connecting lines extending therethrough, and further being configured to adjust the operational length of the kite connecting line upon adjustment of the deflector so as to cause the deflector guide to angularly deflect a portion of the kite connecting line, when in use; and at least one invert correlator, operatively interconnectable to at least two of the plurality of deflector guides for, when in use, inversely correlate the adjustment of the operative length of the respective kite connecting lines;

wherein the plurality of kite connecting lines includes the connection of at least one of the kite connecting lines at the kite biased towards the leading end region of the kite, and the connection of at least another kite connecting line biased towards the trailing end region of the kite, so that these can control the angle of attack of the kite in the air and/or in the wind stream.

The kite control system may also include a support surface for supporting the system. The support surface may be mountable onto a watercraft or onto a vehicle or onto a base. The support surface may be water based. The support surface may be land based. The support surface may be in the form of a rotatable platform.

The plurality of rotators may include reels and/or winch type elements. At least one of the plurality of rotators may be motorised. At least one of the plurality of rotators may further include a brake mechanism to inhibit undesired rotation and to promote one directional rotation only.

The plurality of rotators may include a set of rotators arranged in line and/or sequence with one another and interconnected by the same kite connecting line extending thereinbetween.

At least one of the plurality of rotators may be connected to a generator, to generate electricity when the kite connecting line is reeled out by the pull of the kite.

The plurality of kite connecting lines may be of any suitable form for interconnecting the kite and the system and may for example, include any one or more of a cable, rope or braided line.

The plurality of kite connecting lines may include a pair of trailing kite connecting lines extending in a spaced apart relationship from opposing trailing end regions of the kite towards the rotators.

The plurality of kite connecting lines may include a pair of leading kite connecting lines extending in a spaced apart relationship from opposing leading end regions of the kite towards the rotators.

The plurality of kite connecting lines may include a single leading kite connecting line extending from a leading end region of the kite, the single leading kite connecting line further being adapted to extend from multiple leading end regions of the kite.

The leading and trailing kite connecting lines may also extend from a central region of the kite.

At least one of the plurality of guiding elements may include a pulley or sheave type element, mountable onto the support surface and/or rotatable platform.

At least one of the plurality of guiding elements may also be mounted onto an upper surface.

At least one of the plurality of guiding elements may be pivotally connected to the support and/or upper surface.

The plurality of guiding elements may be arranged in a spaced apart relationship and relative one another so as to define a preferred direction and/or path of the kite connecting line extending from the rotator towards the kite.

In a first form of the invention at least one of the adjustable deflectors may include a deflector base and a deflector shaft operatively connected to the deflector base in a longitudinally adjustable relationship relative thereto. The deflector shaft may further include the deflector guide mounted rotatably onto an upper end portion of the deflector shaft away from the deflector base for rotatably accommodating the at least one kite connecting line extending therethrough.

In a second form of the invention the deflector shaft may include a plurality of deflector guides mounted rotatably in a vertically spaced apart relationship on the deflector shaft, the plurality of deflector guides having the same kite connecting line extending therethrough.

In a third form of the invention the deflector shaft may be mountable in an upright and/or vertical condition, and the deflector base mounted co-axially and displaceably onto the deflector shaft, the deflector base further including the deflector guide mounted rotatably onto an outer surface of the deflector base so that displacement of the deflector base relative the deflector shaft results in deflection of the at least one kite connecting line extending through the deflector guide.

In a fourth form of the invention the at least one deflector may include a pair of deflector bases, the pair of deflector bases mounted in register and extending from two opposite surfaces, respectively, and a deflector shaft operatively interconnecting the pair of deflector bases in a displaceable relationship relative thereto, the deflector shaft further including the deflector guide mounted rotatably thereon so that reciprocation of the deflector shaft between the pair of deflector bases results in deflection of the at least one kite connecting line extending through the deflector guide.

In a fifth form of the invention the deflector shaft further includes a shaft arm mounted transversally and about an upper end region of the deflector shaft in a T-formation, the shaft arm including a pair of deflector guides mounted onto opposing end regions thereof for rotatably accommodating the at least one kite connecting line extending therethrough.

In a sixth form of the invention the at least one deflector may comprise of a pair of deflectors arranged in a side by side manner, and a deflector interconnector for interconnecting the pair of deflector shafts about an upper end region thereof.

In seventh form of the invention the at least one deflector may comprise of a pair of deflectors arranged in a side by side manner and a deflector interconnector for interconnecting the pair of deflector shafts about an upper end region thereoof, and, a deflector guide mounting arrangement extending transversally the deflector interconnector for accommodating a plurality of deflector guides rotatably thereon.

In an eighth form of the invention the deflector base may extend from a surface, a deflector shaft operatively connected to the base and arranged to extend co-axially away from one end portion of the deflector base in a displaceable relationship relative thereto, and, a deflector guide mounted rotatably onto a lower end portion of the deflector shaft for rotatably accommodating the at least one kite connecting line extending therethrough, so that if the deflector pulls the deflector guide towards the deflector base, it shortens the operative length of the kite connecting line guided therethrough.

The deflector guide may include a pulley type element.

The deflector guide may include a sheave type element.

The deflector guide may include a guide formation defined circumferentially about the deflector guide for accommodating the kite connecting line. The guide formation may be in the form of a groove, rail or track shaped and contoured to receive the kite connecting line complementarily therein.

Longitudinal adjustment of the deflector shaft relative the deflector base may be achieved by mechanical, hydraulic, pneumatic, or electric means.

Pneumatically and/or hydraulically, the deflector base may include a pressure chamber for containing liquid and/or gas under pressure, the deflector shaft operably connected to and/or in fluid communication with the pressure chamber so that displacement of the deflector shaft relative the pressure chamber is achieved by regulating the pressure inside the pressure chamber.

The deflector shaft may be configured to fit snugly inside the chamber and may include a chamber receiving portion shaped to fit sealably inside the deflector base, mimicking a piston and cylinder type configuration.

Increasing the relative pressure inside the pressure chamber will push the deflector shaft away from the pressure chamber, and, similarly, decreasing the pressure inside the pressure chamber will result in retraction of the deflector shaft.

The deflector base may also include a pair of pressure chambers, located upper and beneath the chamber receiving portion for containing liquid and/or gas under pressure, wherein displacement of the deflector shaft is facilitated by creating a pressure differential between the pair of pressure chambers defined on opposing sides of the chamber receiving portion.

The deflector may also include a pressure regulator, and/or a regulated valve, for controlling the flow of liquid into, and out of the pressure chamber, and/or the pair of pressure chambers, respectively.

The pressure regulator may be in the form of a pump and an overpressure valve may further be included for regulating the maximum pressure in the pressure chamber, and/or the pair of pressure chambers.

Mechanically, displacement of the deflector shaft relative the deflector base may be achieved by the inclusion of a worm gear arrangement wherein longitudinal displacement of the deflector shaft relative the deflector base is achieved by rotation of the worm.

Displacement of the deflector shaft relative the deflector base may be facilitated by including a piston and cylinder configuration.

Displacement of the deflector shaft relative the deflector base may be facilitated by the deflector base and deflector shaft complementarily threaded so that displacement of the deflector shaft relative the deflector base is achieved by rotating the deflector shaft relative the deflector base.

Displacement of the deflector shaft relative the deflector base may be facilitated by the deflector shaft being in the form of a toothed rod and the deflector base complementarily contoured to allow the deflector shaft to be displaced relative the deflector base.

Displacement of the deflector shaft relative the deflector base may be facilitated by the inclusion of a ball screw configuration.

Displacement of the deflector shaft relative the deflector base may be facilitated by the inclusion of a cogwheel and guided track configuration.

The mechanical displacement of the deflector shaft relative the deflector base may be facilitated by the inclusion of an electrical motor.

In order to avoid the deflector from buckling and or yielding under any pressure exerted thereon by the kite and the kite connecting lines, at least one of the plurality of deflectors may further include a support for supporting the deflector shaft co-axially relative the deflector base. The support may comprise a frame or any other similar type of formation.

It is to be appreciated that multiple deflectors according to this form of the invention may be arranged in series and/or interconnected by the same kite connecting line extending therebetween and that factors such as kite size, kite shape and architecture, weather conditions, and the like, may dictate the amount and type of deflector to be incorporated to yield the desired steering results.

In use the guiding elements may be arranged about the deflector, on opposing regions thereof and in register with one another and the deflector guide, so as to direct the at least one kite connecting line coplanar or in a straight path therethrough.

The guiding elements may be arranged about the deflector base so as to keep in place the kite connecting line which extends through the guide elements and the deflector guide, so that displacement of the deflector shaft causes the kite line to yield about the portion of kite connecting line inbetween the guide elements, thereby causing adjustment of the operational length of the kite connecting line.

The at least one invert correlator may be configured to inversely correlate the degree of adjustment of one deflector shaft relative to another coupled deflector shaft so as to cause the operational length of one kite connecting line to increase the same degree as the other retracts, and vice versa.

The at least one invert correlator may correlate the inverse adjustment of the operational length of one trailing kite connecting line versus another trailing kite connecting line.

Similarly, the at least one invert correlator may correlate the inverse adjustment of the operational length of one trailing kite connecting line versus one leading kite connecting line.

Inversely correlating the degree of displacement between a pair of coupled deflector guides responsible for adjusting the operational length of trailing kite connecting lines will allow a user to steer the kite towards the left, or the right.

Inversely correlating the degree of displacement between a pair of deflector guides wherein one deflector guide regulates the operational length of one leading kite connecting line, and the other the operational length of one trailing kite connecting line, will allow a user to change the kite's angle of attack.

It is to be appreciated that in accordance with the skill of the art employed for steering kites of the kind that the invert correlator can be coupled to any combination of deflectors wherein the steering of the kite necessitates the correlation of inverse degree of displacement of one deflector shaft relative another, or, more than one other deflector shaft.

In one form of the invention the invert correlator may take the form of an invert correlator arm pivotally interconnecting a pair of deflector guides, the invert correlator arm further being pivotally supported about a mid region thereof by a invert correlator arm support.

In another form of the invention the invert correlator may take the form of a hydraulic interconnection and/or hydraulic coupling in fluid communication with pressure chambers of coupled deflector bases for correlating the pressure inside the coupled pressure chambers. Increasing the pressure underneath the chamber receiving portion of one deflector base will result in the deflector shaft to extend away therefrom, while causing the corresponding deflector shaft to similarly retract. This hydraulic interconnection inversely correlates the volume of liquid or gas in coupled pressure chambers. The hydraulic invert correlator may include a one-way valve for regulating the pumping of liquid into the respective chambers.

In a further form of the invention the invert correlator may take the form of a rope and rope guiding arrangement, wherein opposing end regions of the rope are connected to the respective deflector shafts and/or deflector guides, the rope guiding arrangement defining a guided tensioned path for the rope.

In yet a further form of the invention the invert correlator may comprise a displaceable correlator coupling for interconnecting two deflector guides in a spaced apart relationship on the correlator coupling, each deflector guide having its own kite connecting line extending therethrough, and wherein the respective kite connecting lines engage with the deflector guides in regions facing one another. The invert correlator may further include a correlator displacer for co-axial and/or vertical displacement of the correlator coupling. The invert correlator may further include a kite line arrangement for directing the respective kite lines upper and lower the invert correlator for facilitating the engagement of the kite lines with the deflector guides in regions facing one another.

In other words, the invert correlator take the form of at least two interconnected deflector guides, operatively connected to one another, each deflector guide having its own kite connecting line extending therethrough, so that, upon displacement of the deflector guides into the same direction, the inverse correlator inversely correlate the adjustment of the operative length of the respective kite connecting lines, when in use.

In use, more than one embodiment of the inverse correlator may be employed in combination.

The kite control system may further include one or more tension sensors for measuring and communicating the detected tension measurements of at least one of the plurality of kite connecting lines at various locations thereof.

The tension measurements may be communicated to a control system.

The tension sensor may be located about the rotator and measuring the pulling force exerted on the rotator by the kite connecting line.

The tension sensor may also be operatively located about the deflector guide for measuring the downward pressure exerted on the deflector shaft by the kite connecting line extending therethrough.

The tension sensor may also be operatively connected to the deflector base for measuring the pressure exerted thereon by the deflector shaft as a result of the tension in the kite connecting line.

The tension sensor may be operatively connected to a guide element so as to measure the tension exerted on the guide element by the kite connecting line.

The tension sensor may be located between two rope segments of the invert correlator rope.

In one form of the invention the tension sensor may include a pair of plates displaceably interconnected to one another at opposing regions thereof, each plate further including a series and/or row of pulleys arranged in a spaced apart relationship on inner surfaces of the plates, one row of pulleys facing the other, with the kite line extending between the two rows of pulleys and longitudinally the sensor.

The pair of plates may further be biased towards one another by a biasing member such as a pair of coiled springs interconnecting the plates at opposing end regions thereof, or any other means to exert a constant pull on the plates, towards one another.

The sensor may further include a displacement sensor for measuring displacement of the plates relative one another.

The displacement sensor may include a pair of rods extending from the inner plate surfaces and towards one another. In a resting condition the opposing end region of the rods will be near and/or in abutment with one another.

Tensioning of the kite connecting line extending therethrough will cause the kite connecting line to push away the two rows of pulleys from one another, thereby displacing the plates and the end regions of the rods away from one another.

The kite control system may also include positioning sensors located about one or more of the kite connecting lines for measuring the position of the kite connecting line in space.

The positioning sensors may similarly be located about the support surface to measure degree of rotation of the support surface, the degree of rotation resultant from the orientation of the kite in space.

The positioning sensors may also be located about the guide elements where the guide elements are pivotally connected to the support surface, the positioning sensor sensing the degree of rotation of the guide element relative the support surface.

The kite control system may also include pressure sensors for measuring the pressure exerted by the deflector shafts on the pressure chamber inside the deflector base.

The pressure sensor may be located about a guide element for measuring pressure experienced by the guide element.

The kite control system may further include displacement sensors for detecting the degree of displacement of the deflector shaft relative the deflector base.

The displacement sensors may also be mounted operatively about the rotators for measuring degree of rotation and thereby determine the length of kite connecting line stored on the rotator, as well as the length of operable kite connecting line extending between the rotator and the kite.

The kite control system may also include an optical sensor configured to detect a degree of stretch in the kite connecting line as a result of the tension experienced by the kite connecting line.

The kite control system may further include a control device configured to receive input from the various sensors. The control device may further be configured to interpret the data received from the various sensors.

The kite control system may further include a sheath and guide arrangement mountable about the kite connecting lines for constraining the kite connecting lines, wherein the guide arrangement includes an input guide for guiding the kite connecting lines into the sheath, and an output guide to keep the lines together just after the sheath and for guiding the kite connecting lines in a spaced apart manner from the sheath towards the kite, respectively.

The input and/or output guide arrangement may further include its own mounting arrangement for mounting the input and/or output guide on the kite connecting lines.

The elements of the guide arrangement may be mounted inside a support frame, and the guide elements and/or the support frame may be connected to the kite connecting lines, to prevent it from moving downwards, away from the kite, and/or to the upper surface, to prevent it from moving upwards, away from the upper surface.

DETAILED DESCRIPTION OF THE INVENTION

The invention is now described by way of example with reference to the accompanying drawings.

Figure 1:
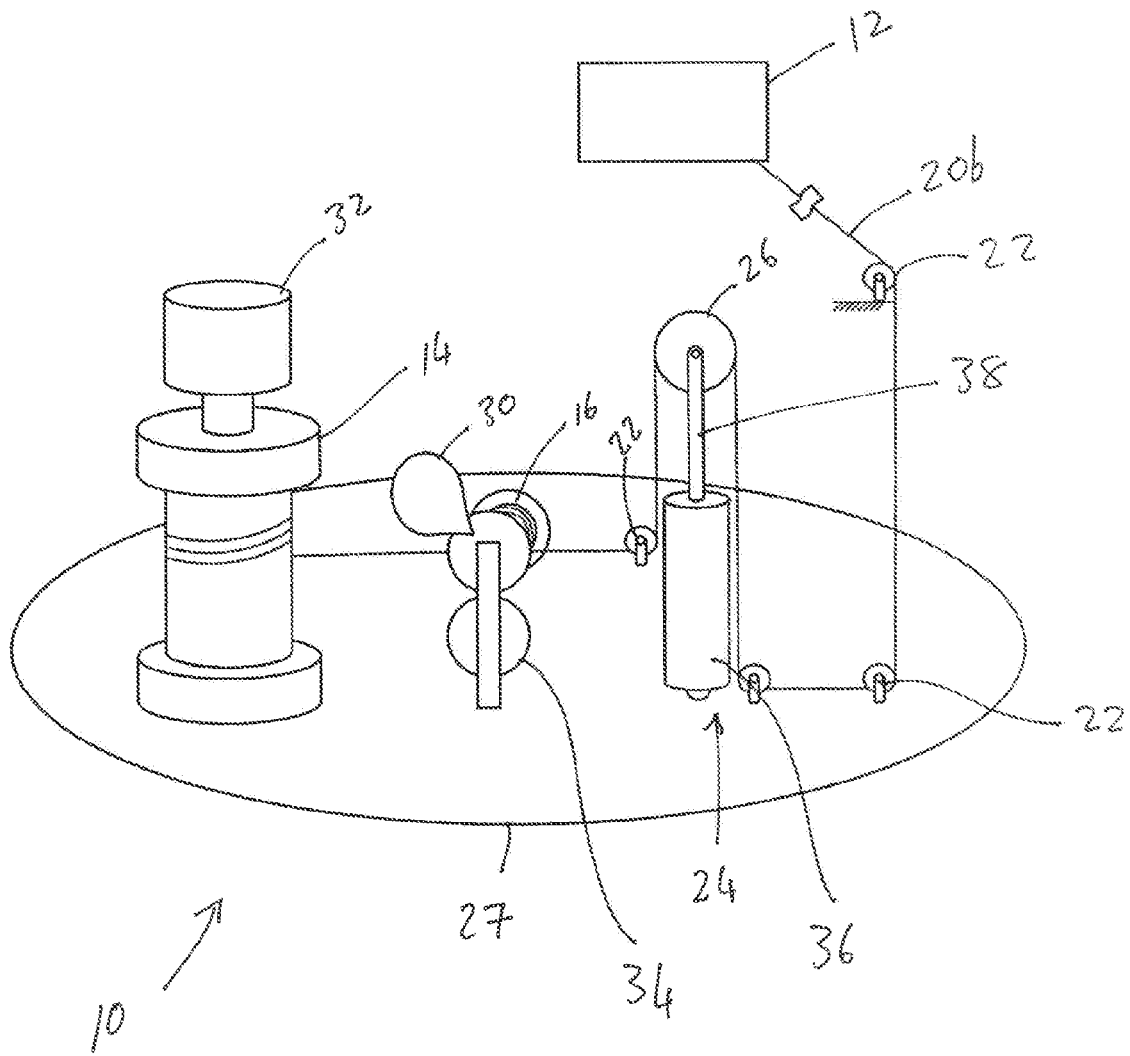
FIG. 1 is a schematic representation depicting a first embodiment of the deflector in its simplest form for manipulating one kite connecting line only.

Referring now to the drawings, the kite control system in accordance with the invention, is generally indicated by reference numeral 10.

For clarity purposes, kite connecting lines extending between one or more leading end regions of the kite and the kite control system will be depicted as dotted lines, while kite connecting lines extending between the trailing end regions of the kite and the kite control system will be depicted as solid lines.

Referring to the figures in general, a general embodiment of the kite control system 10 for controlling a kite 12 includes a plurality of rotators in the form of reel 14, and winch type elements 16, arranged in line with one another and interconnected to leading 18 and trailing 20 kite connecting lines, respectively, for adjusting the operational length of the one or more kite connecting lines upon rotation thereof, a plurality of guiding elements 22 locatable between each of the plurality of rotators and the kite 12 for guiding and defining a kite line path for each of the leading 18 and trailing 20 kite connecting lines from the rotators towards the kite, a plurality of longitudinally adjustable deflectors 24 locatable inbetween at least one of the plurality of rotators and the kite 12, a plurality of deflector guides 26, each of which is operatively connected to at least one of the plurality of deflectors 24, and having at least one of the plurality of kite connecting lines extending therethrough, and further being configured to adjust the operational length of the kite connecting line upon longitudinal adjustment of the deflector 24 so as to cause the deflector guide 26 to angularly deflect a portion of the kite connecting line, when in use, and at least one invert correlator 28 operatively interconnectable to at least two of the plurality of deflector guides 26 for, when in use, inversely correlate the adjustment of the operative length of the respective kite connecting lines extending through deflector guides 26.

While the reel 14 and winch-type elements 16 will be used for major adjustment of the operational length of the kite lines 18 and 20, respectively, such as for haul-in and haul-out the kite 12, the steering of the kite 12 which necessitates the simultaneous minor and/or more slight adjustment of the operational length of the various kite connecting lines will be facilitated by the deflectors 24.

The kite control system 10 will typically be mounted onto a rotatable support surface such as a rotatable platform 27, the rotatable platform 27 in turn being typically being mounted onto a watercraft (not shown), or, on a vehicle, or on a fixed base.

The kite connecting lines 18 and 20 can be in the form of a cable, rope or braided line.

Figure 29:
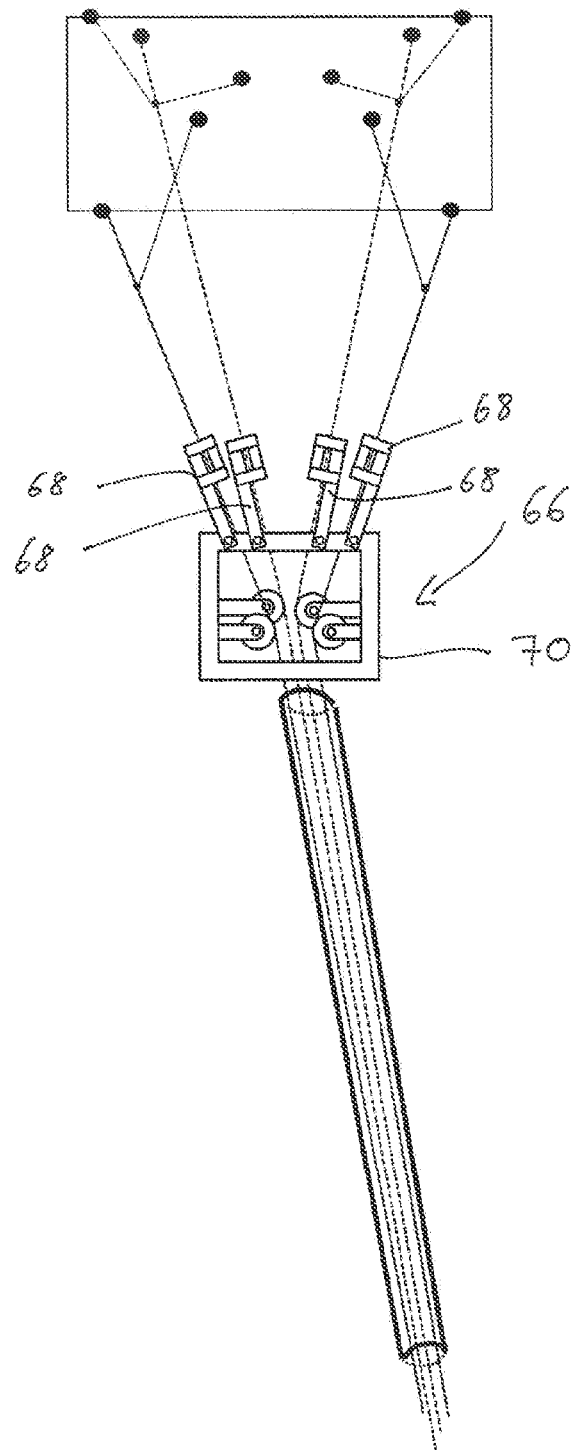

Typically, a pair of leading kite connecting lines 18a and 18b will extend from leading end regions of the kite 12, while a pair of trailing kite connecting lines 20a and 20b, typically extends from opposing trailing end regions of the kite 12. Alternatively, the leading 18 and trailing 20 kite connecting lines can also be connected more centrally the kite 12, as illustrated in FIG. 21 or FIG. 29.

Figure 21:
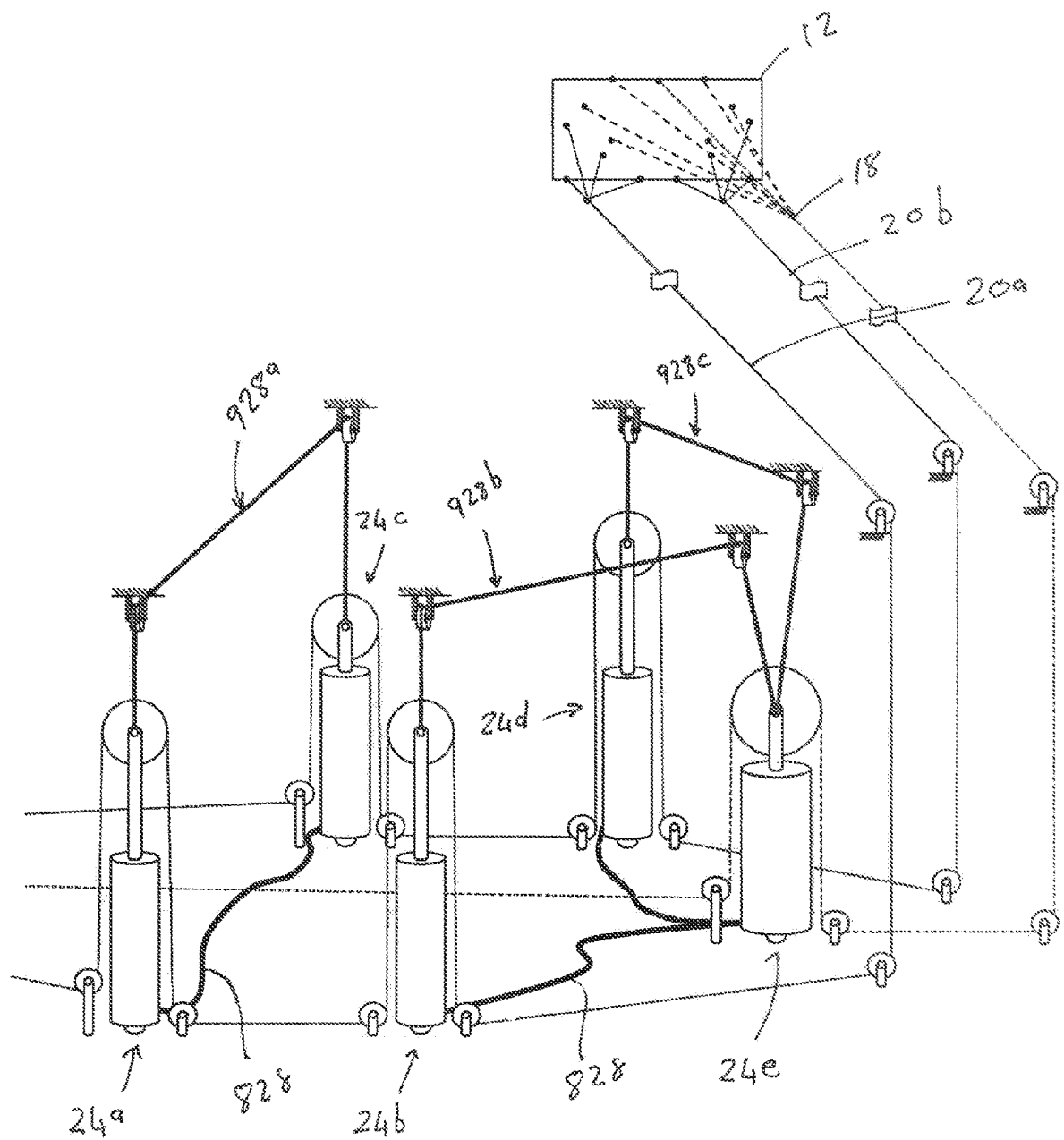
FIG. 21 is a further schematic illustration of the second and third embodiments of the invert correlator, when in use.

The leading kite connecting line 18 can also be in the form of a single leading kite connecting line extending from a leading end region of the kite 12, the single leading kite connecting line 18 further being adapted to extend from multiple leading end regions of the kite 12, including central regions of the kite, also shown in FIG. 21.

The leading kite connecting line(s) 18 may merely have a bias towards the leading end region of the kite, while connecting other regions of the kite, too, and the trailing kite connecting line 20 may merely have a bias towards the trailing end region of the kite, while connecting other regions of the kite, too. In this manner, their differential connection biases can control the angle of attack of the kite in the air and/or in the wind stream.

In a similar way, both kite connecting lines, leading line 18 and trailing line 20, when used in pairs, can be biased towards the left-hand or right-hand side of the kite. In this manner, their differential connection biases can control the steering of the kite to the left and to the right.

The reel 14 and/or winch type elements 16 can be motorised and the winch type element 16 will typically include a brake mechanism 30 to inhibit undesired rotation and to promote one directional rotation only.

The rotational movement of the reel 14 and winch type elements 16 effected by the hauling power of the kite 12 can be harvested and used for generating electricity by the inclusion of a generator 32 operably connected to the reel type element 14. Winch type element 16 can further include a motor 34 for driving the winch type element 16. Alternatively, the generator may be connected to winch type element 16. Structures 32 and 34 may be a motor, or a generator, or both, or these structures may include both a motor and a generator, separately.

The guide elements 22 will typically be in the form of pulleys and/or sheave type elements and pivotally mountable onto the rotatable platform 27 as well as on an upper surface if needed, and, in a spaced apart relationship, so as to define a preferred direction and/or path of the kite connecting lines extending from and interconnecting the reel type elements 14, winch type elements 16 and deflectors 24, extending towards the kite 12.

Figure 3:
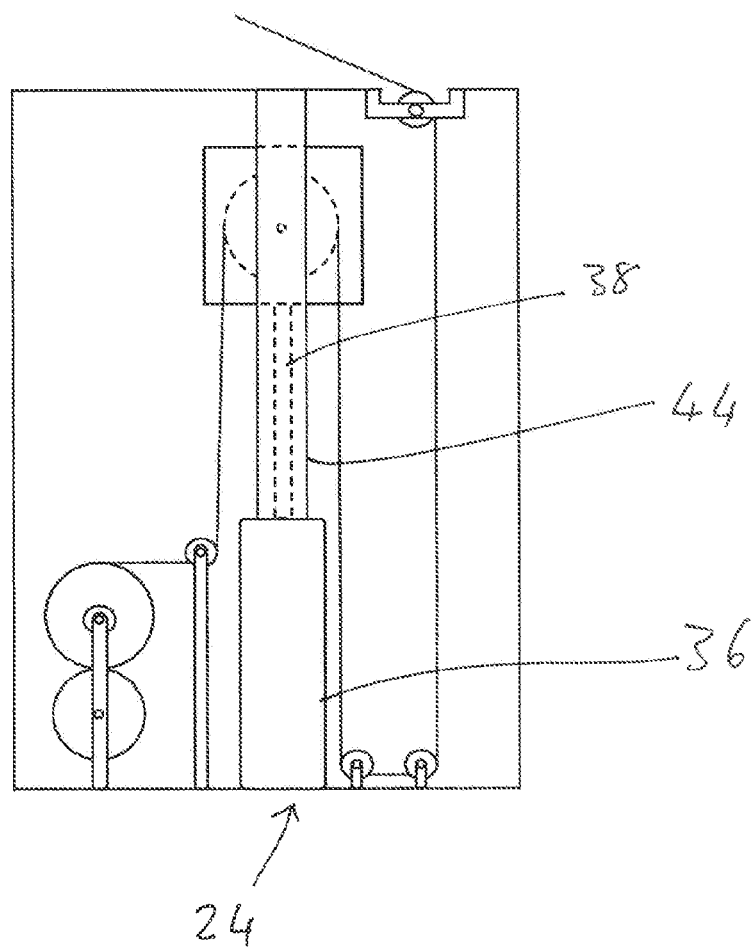
FIG. 3 is a schematic illustrating the support for supporting the deflector.
Figure 4:
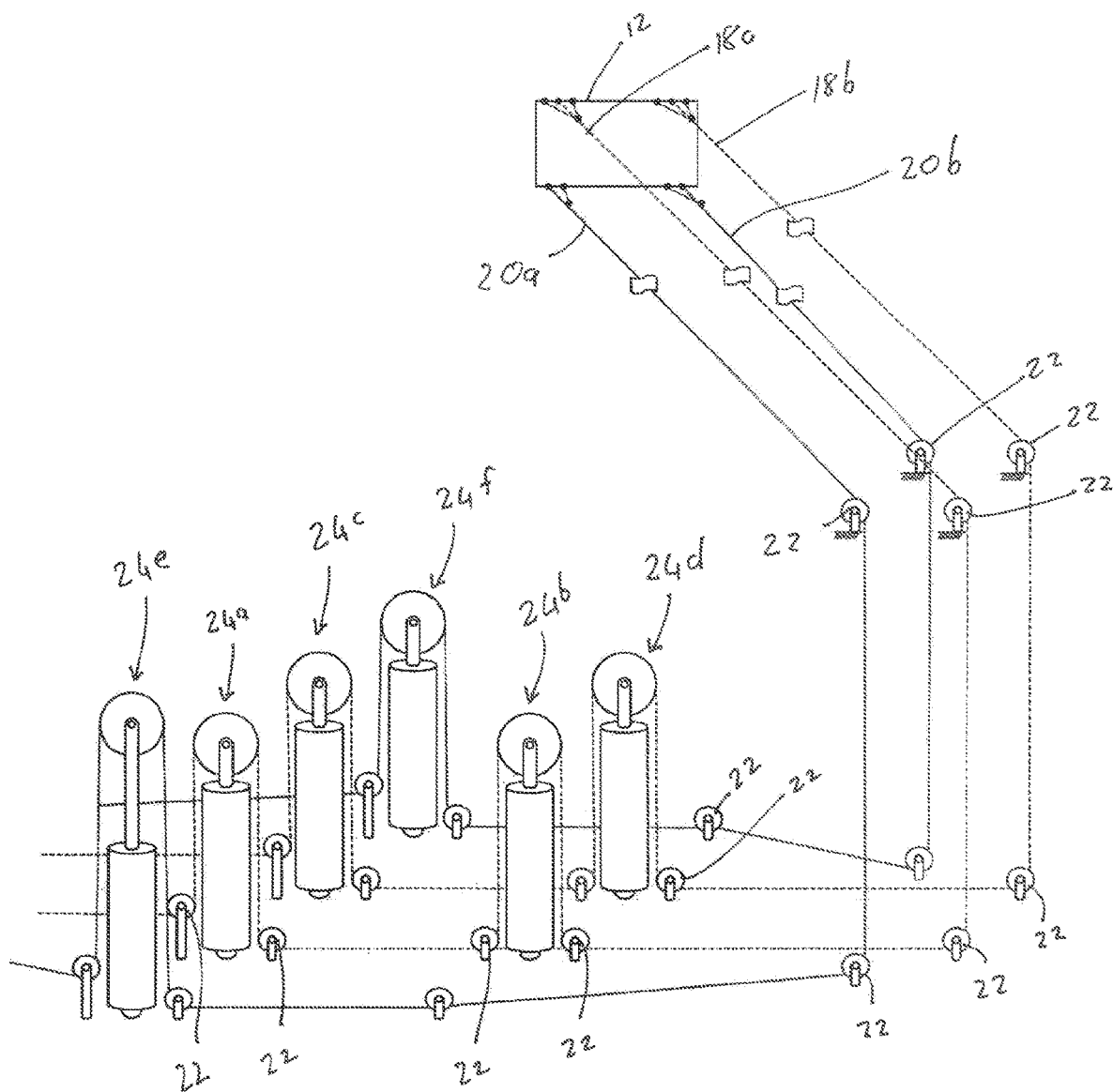
FIG. 4 is a schematic of the deflector shown in FIG. 1, when in use.

In accordance with a first embodiment of the deflector 24, more clearly shown in FIGS. 1, 3 and 4, the deflector 24 includes a deflector base 36, and a deflector shaft 38 which is arranged to extend and co-axially away from the deflector base 36 in a displaceable relationship relative thereto. The deflector shaft 38 includes the deflector guide 26 mounted rotatably onto an upper end portion of the deflector shaft 38 for rotatably accommodating the kite connecting line extending therethrough.

FIG. 1 shows a typical setup for adjusting the operational length of trailing kite connecting line 20b, which extends from the reel type element 14 and the winch type element 16, through guide elements 22, deflector 24 and towards the kite 12.

The guide elements 22 are typically mounted on opposing sides of the deflector base 36 so as to keep the kite connecting line 20b in place, while displacement of the deflector shaft 38 relative deflector base 36 causes the deflector guide 26 to adjust the operational length of the kite connecting line 20b when moving upward, and, downward relative the deflector base 36.

The guide elements 22 will preferably be located about the deflector 24 so as to guide kite connecting line 20b coplanar and in a straight path from the first guide element 22 through the deflector guide 26 and towards the second guide element 22, the kite line 20b spanning the deflector guide 26.

Displacement of the deflector shaft 38 relative the deflector base 36 will typically be hydraulically, but can also be pneumatically, mechanically, or even electric power driven.

FIGS. 6, 7, 12, 14, 15, 18 and 19, illustrate different embodiments of the deflector 24 wherein displacement of the deflector guide 26 relative the deflector base 36 is hydraulically driven. Deflector base 36 includes a pressure chamber, designed to keep liquid under pressure. The deflector shaft 38 is further operably designed to fit snugly inside the chamber and includes a chamber and or deflector base receiving portion 40 for sealably fitting inside deflector base 36 mimicking a piston and cylinder configuration.

Displacement of the deflector shaft 38 relative the deflector base 36 is achieved by regulating the pressure underneath the chamber receiving portion 40. Increasing the pressure will push shaft 38 outward, while a relative decrease in pressure will allow the deflector shaft to retract.

The inclusion of a pressure regulator and/or valve 42 will facilitate the flow into and out of the chamber and/or deflector base 36. Typically, a valve control will also be included for keeping the pressure below a desired range.

Alternatively, mechanical displacement of the deflector shaft 38 relative the deflector base 36 can also be facilitated by the inclusion of a worm gear arrangement (not shown) wherein longitudinal displacement of the deflector shaft 38 relative the deflector base 36 is achieved by rotation of the worm.

Mechanical displacement of the deflector shaft 38 relative the deflector base 36 can also be facilitated by having the deflector base and deflector shaft complementarily threaded so that displacement of the deflector shaft 38 relative the deflector base 36 is achieved by rotating the deflector shaft 38 relative the deflector base 36.

Mechanical displacement of the deflector shaft 38 relative the deflector base 36 can also be facilitated where the deflector shaft 38 takes the form of a toothed rod and the deflector base 36 is complementarily contoured to allow the deflector shaft 38 to be displaced relative the deflector base 36.

Mechanical displacement of the deflector shaft 38 relative the deflector base 36 can also be facilitated by the deflector shaft 38 and deflector base 36 assuming a ball screw configuration, and/or a cogwheel and guided track configuration and can further also be electric power driven.

Figure 2:
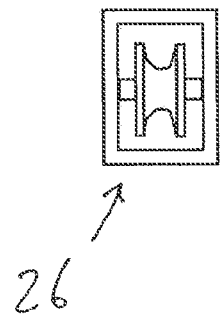
FIG. 2 shows a side view of the deflector guide.

FIG. 2 shows a side view of the deflector guide 26 which shows the circumferentially defined groove and/or kite connecting line receiving portion.

FIG. 3 shows the support 44 for supporting the deflector 24 in the form of a frame, particularly for supporting the deflector shaft 38 in a vertical orientation. It is to be appreciated that the support 44 can take any form, for example a guided track, guided formation, or the like.

FIG. 4 depicts one possible arrangement of the deflectors 24 wherein a pair of deflectors 24a and 24b are arranged in series and interconnected by the same leading kite connecting line 18a extending therethrough.

A pair of further deflectors 24c and 24d are arranged in series and interconnected by the other leading kite connecting line 18b.

One deflector each 24e and 24f, respectively, are further mounted to manipulate the operational length of each of the trailing kite connecting lines, 20a and 20b, respectively.

Figure 5:
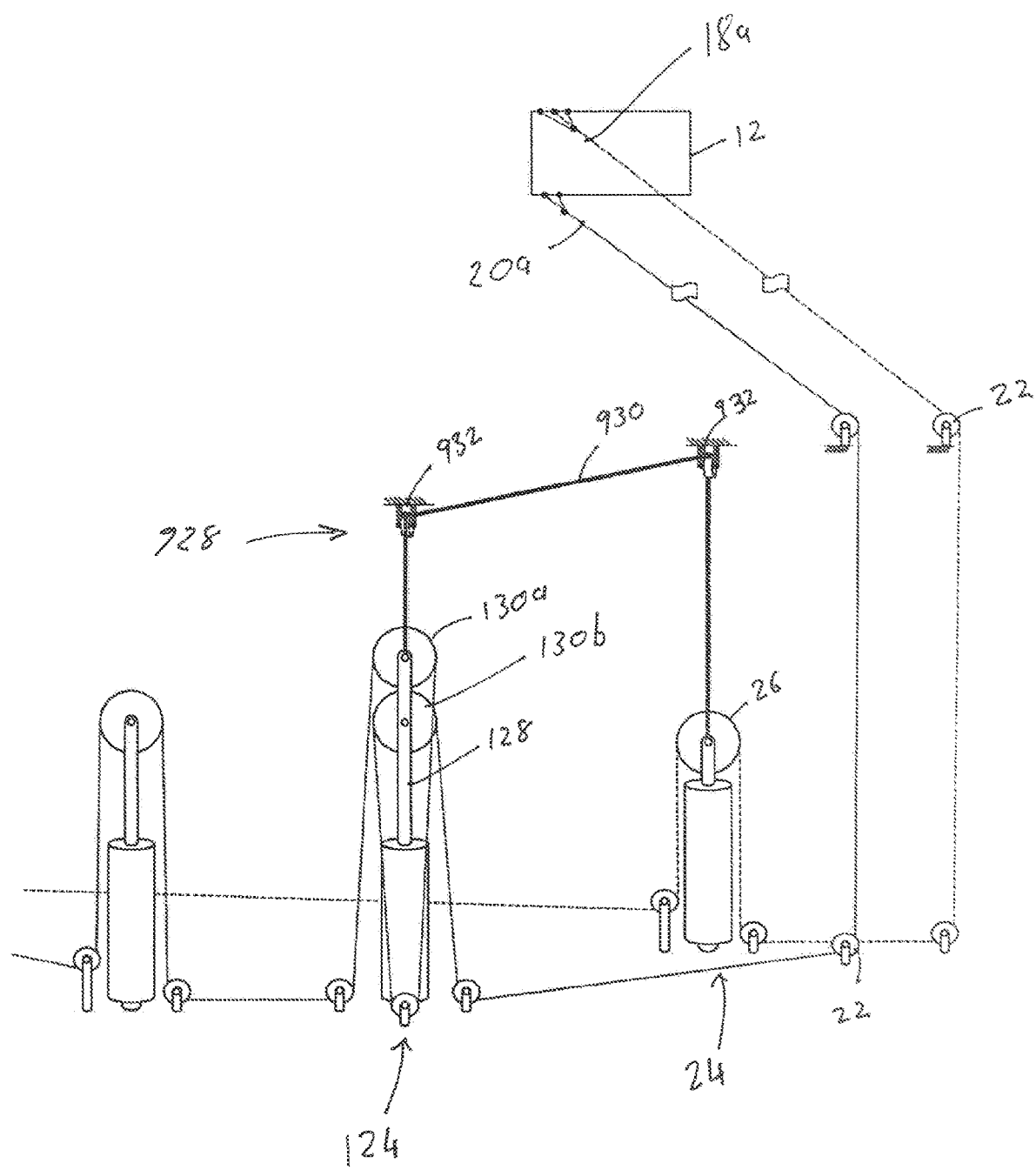
FIG. 5 shows a second embodiment of the deflector.

FIG. 5 shows a second embodiment of the deflector, 124, where the deflector 124 includes a deflector base 126, a deflector shaft 128 extending therefrom, and a pair of deflector guides 130a and 130b mounted in a vertically spaced apart relationship on the deflector shaft 128. The threading of trailing kite connecting line 20a through both deflector guides 130a, 130b, necessitates the incorporation of three guide elements and or pulleys 22, mounted about the deflector base 126.

Figure 6:
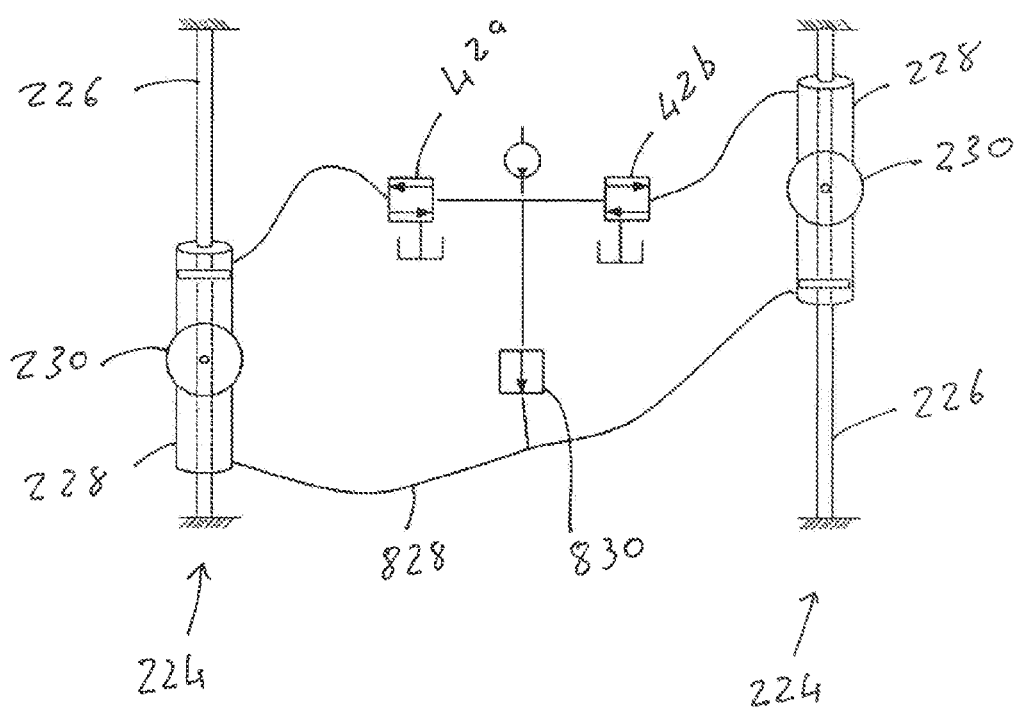
FIG. 6 shows a third embodiment of the deflector, depicted in coupled relationship.

FIG. 6 shows a third embodiment of the deflector, 224, herein depicted in an hydraulically and/or pneumatically interconnected paired relationship.

The deflector shaft 226 is mounted in an upright condition, and the deflector base 228 mounted displaceably onto the deflector shaft 226. The deflector base 228 further includes the deflector guide 230 mounted rotatably onto an outer sidewall thereof so that displacement of the deflector base 228 relative the shaft 226 results in deflection of the corresponding kite connecting line (not shown) extending through the deflector guide 230.

Figure 7:
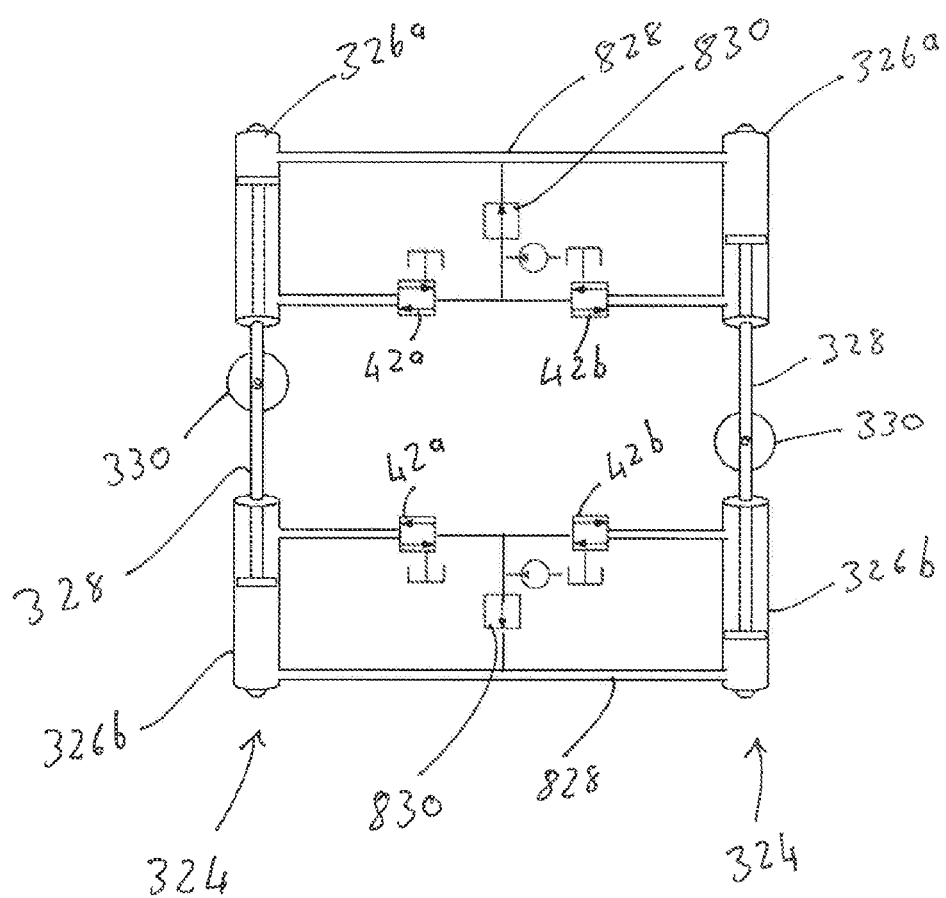
FIG. 7 shows a fourth embodiment of the deflector, depicted in coupled relationship.

FIG. 7 shows a fourth embodiment of the deflector, 324, also herein depicted in an hydraulically interconnected relationship.

Deflector 324 includes a pair of bases 326a and 326b mounted in register on upper and lower surfaces respectively. The deflector shaft 328 operatively interconnects the pair of bases 326a and 326b, and is further mounted displaceably relative thereto, the deflector shaft 328 further including the deflector guide 330 mounted rotatably about a mid region thereof so that reciprocation of the deflector shaft 328 between the pair of deflector bases 326a and 326b results in deflection of the at least one kite connecting line extending through deflector guide 330. (not shown).

Figure 8:
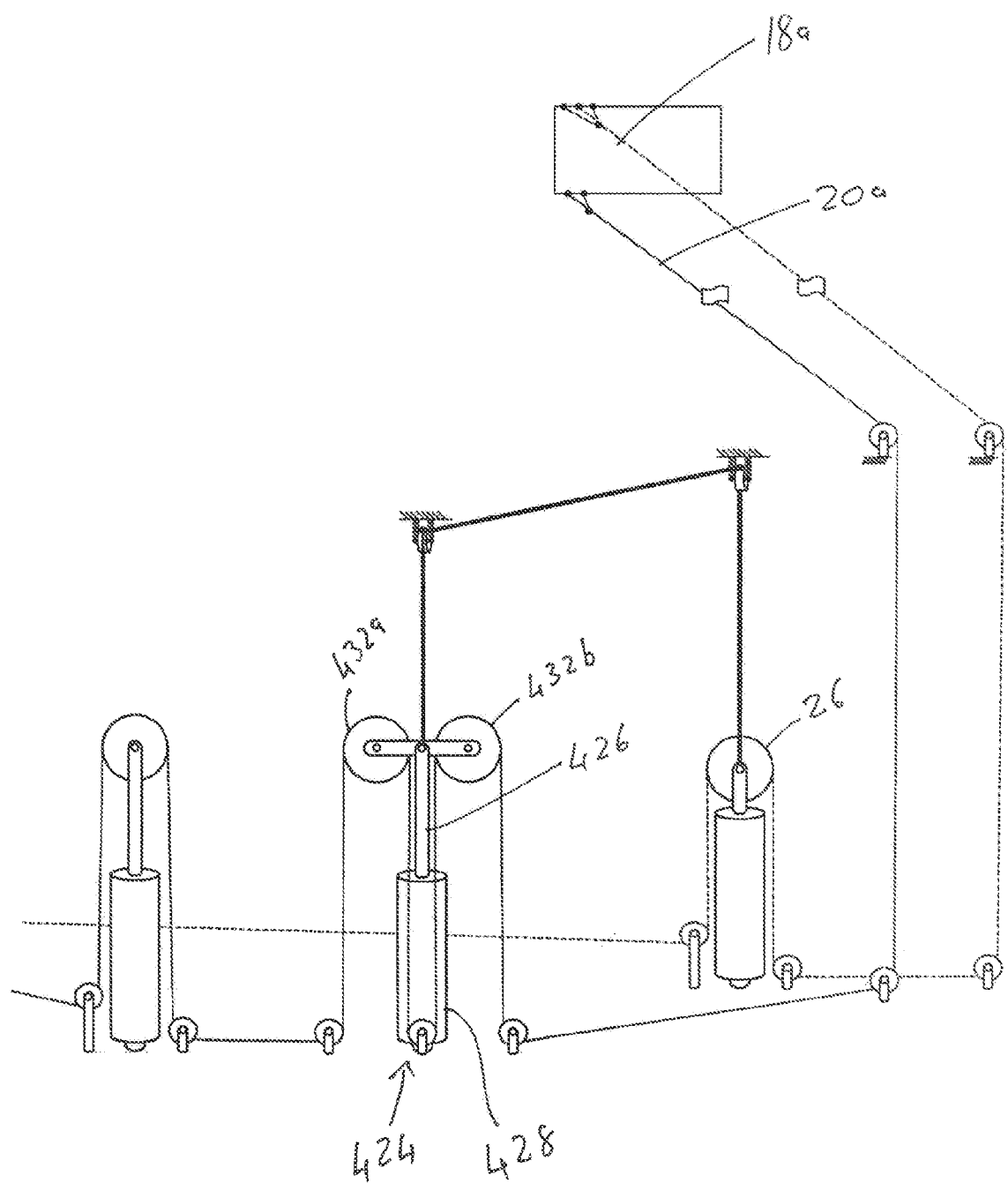
FIG. 8 shows a fifth embodiment of the deflector.

FIG. 8 depicts a fifth embodiment of a deflector 424. The deflector shaft 426 is operably connected to the deflector base 428 and arranged to extend upward and co-axially away from one end portion of the base 428 in a displaceable relationship relative thereto, the deflector shaft 426 further a shaft arm 430 mounted transversally and about an upper end portion of the deflector shaft 426 in a T-formation, the shaft arm 430 further including a pair of deflector guides 432a, 432b, mounted onto opposing end regions of shaft arm 430 for rotatably accommodating trailing kite connecting line 20a therethrough.

Figure 9:
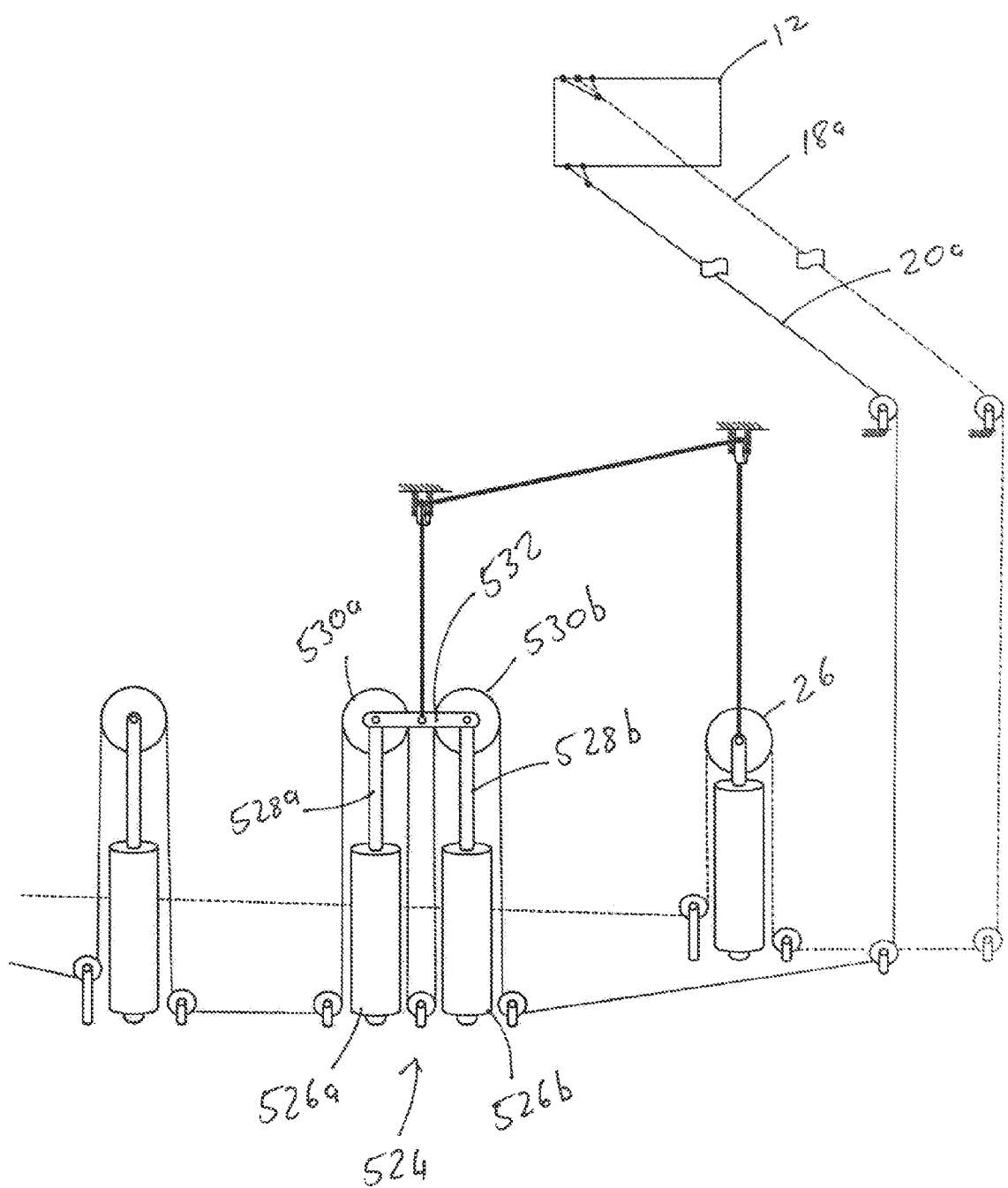
FIG. 9 shows a sixth embodiment of the deflector.

FIG. 9 shows a sixth embodiment of the deflector, 524, which includes a pair of deflector bases 526a and 526b arranged in a side by side manner; and a pair deflector shafts 528a and 528b operatively connected to each of the pair of bases and arranged to extend upward and co-axially away from one end portion of each of the pair of deflector bases 526a and 526b in a displaceable relationship relative thereto, each deflector shaft 528a and 528b, further including a deflector guide 530a and 530b mounted rotatably onto an upper end portion of each of the deflector shafts for rotatably accommodating the same trailing kite connecting line 20a therethrough; and a deflector interconnector 532 for interconnecting the pair of deflector shafts 528a and 528b about an upper end region thereof.

Figure 10:
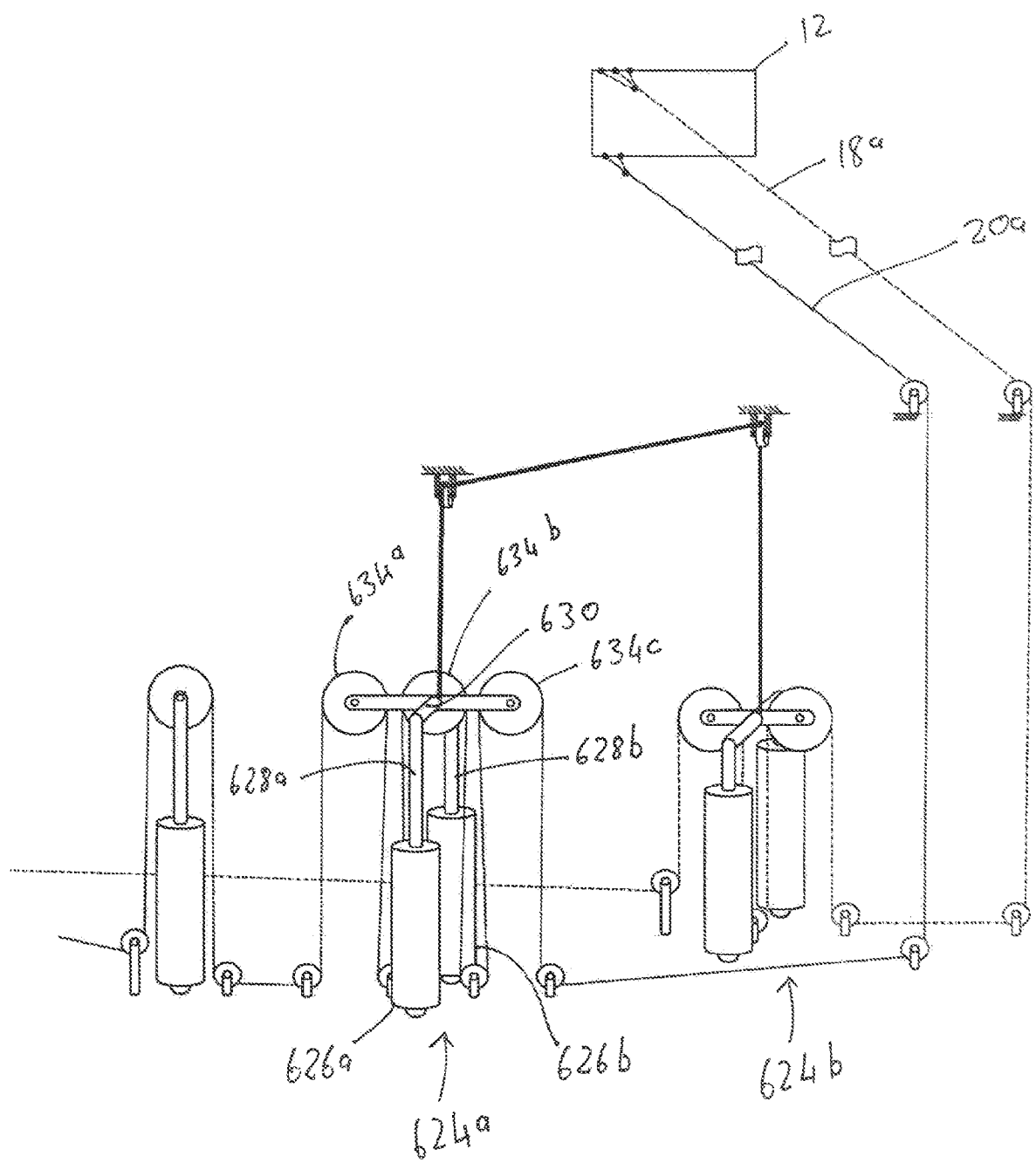
FIG. 10 shows a seventh embodiment of the deflector.

FIG. 10 depicts a seventh embodiment of deflector, 624, which includes a pair of deflector bases 626a and 626b arranged in a side by side manner, a pair of deflector shafts 628a and 628b operatively connected to each of the pair of bases 626a and 626b, respectively, and arranged to extend upward and co-axially away from one end portion of each of the pair of deflector bases in a displaceable relationship relative thereto, a deflector interconnector 630 for interconnecting the pair of deflector shafts 628a and 628b about an upper end region thereof, and a deflector guide mounting 632 extending transversally the deflector interconnector 630 for accommodating a plurality of deflector guides 634 rotatably thereon.

Figure 11:
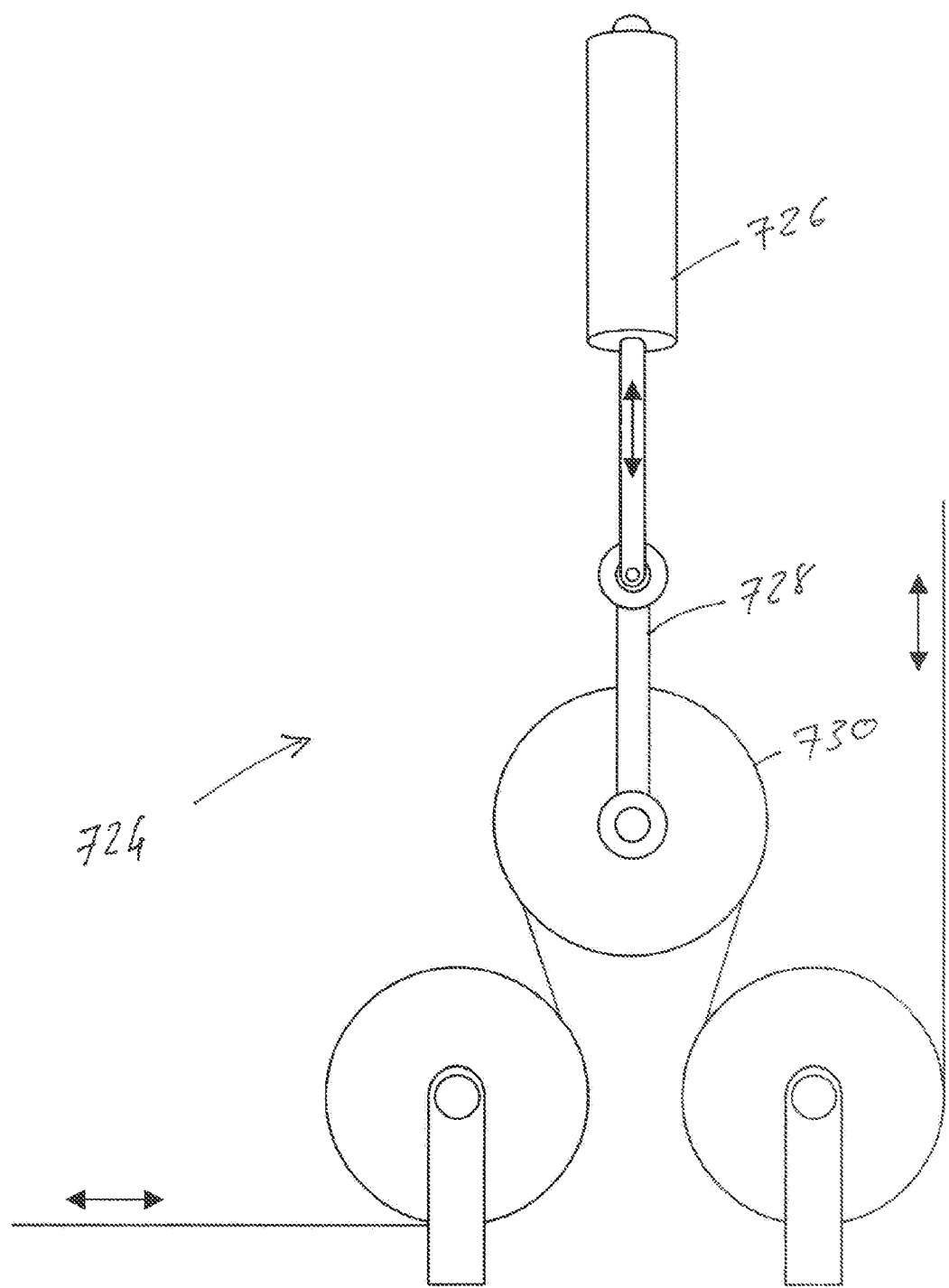
FIG. 11 shows an eighth embodiment of the deflector.

FIG. 11 shows an eighth form of the deflector, 724 which includes a deflector base 726 extending downward from an upper surface, a deflector shaft 728 operatively connected to the base 726 and arranged to extend downward and co-axially away from one end portion of the deflector base 726 in a displaceable relationship relative thereto, and a deflector guide 730 mounted rotatably onto an end region of the deflector shaft 728 for rotatably accommodating the at least one kite connecting line extending therethrough. In this form the deflector 724 will shorten the kite connecting line when the deflector shaft 728 retracts towards the deflector base 726 (shortening the lines "on pull" of the deflector, as opposed to shortening the lines "on push" of the deflector, as shown in preceding Figures). This form of the deflector can be combined with any other preceding forms or the deflector.

The at least one invert correlator is configured to inversely correlate the degree of longitudinal displacement of one deflector guide relative to another coupled deflector guide so as to cause the operational length of the one kite connecting line extending through the one deflector guide to increase the same degree as the other kite connecting line retracts, and vice versa.

In use, inversely correlating the degree of displacement between a pair of coupled deflector guides responsible for adjusting the operational length of trailing kite connecting lines 20a and 20b will allow a user to steer the kite towards the left, or the right.

Similarly, inversely correlating the degree of displacement between a pair of deflector guides wherein one deflector guide regulates the operational length of one leading kite connecting line 18a, and the other the operational length of one trailing kite connecting line 20a, will allow a user to change the kite's angle of attack.

It is to be appreciated that in accordance with the skill of the art employed for steering kites of the kind that the invert correlator can be coupled to any combination of deflectors wherein the steering of the kite necessitates the correlation of inverse degree of displacement of one deflector shaft relative another, or, more than one other deflector shaft.

It is further to be appreciated that the deflector can be mounted in any orientation, extending upwards from a lower surface, or downwards from an upper surface, or horizontally or even diagonally, or any other direction.

Figure 12:
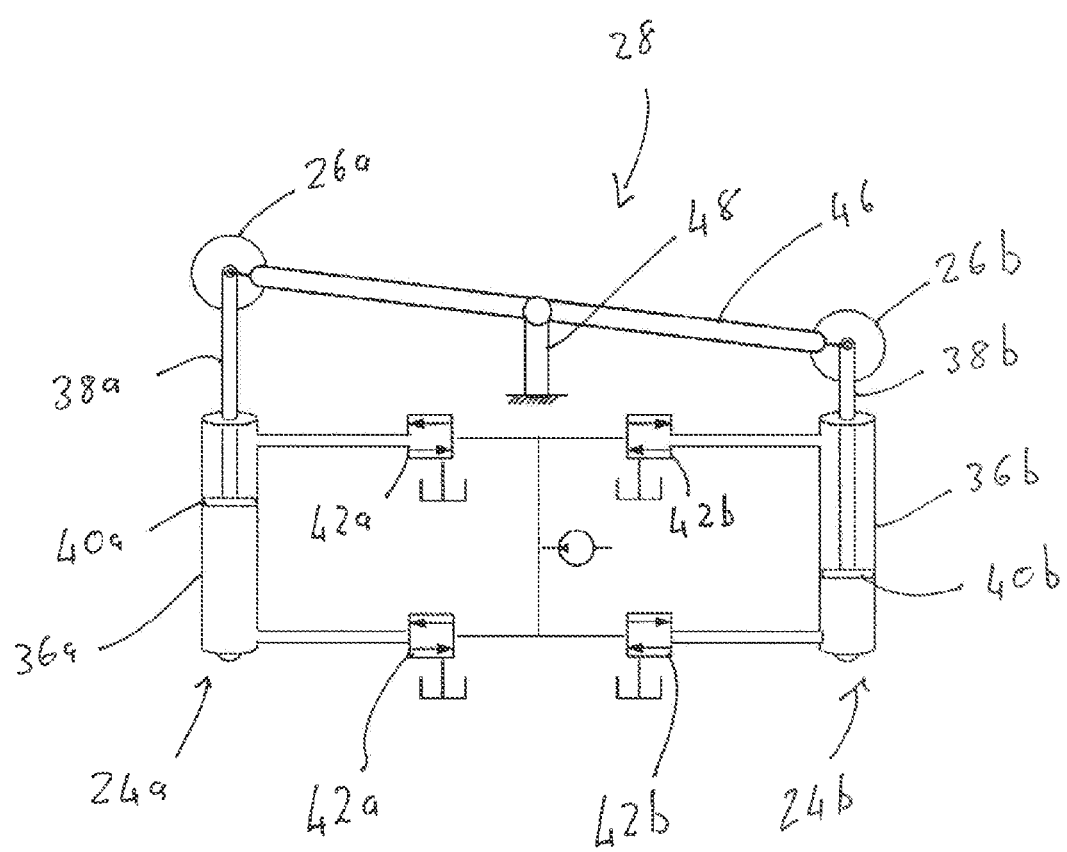
FIG. 12 shows a first embodiment of the invert correlator.
Figure 13:
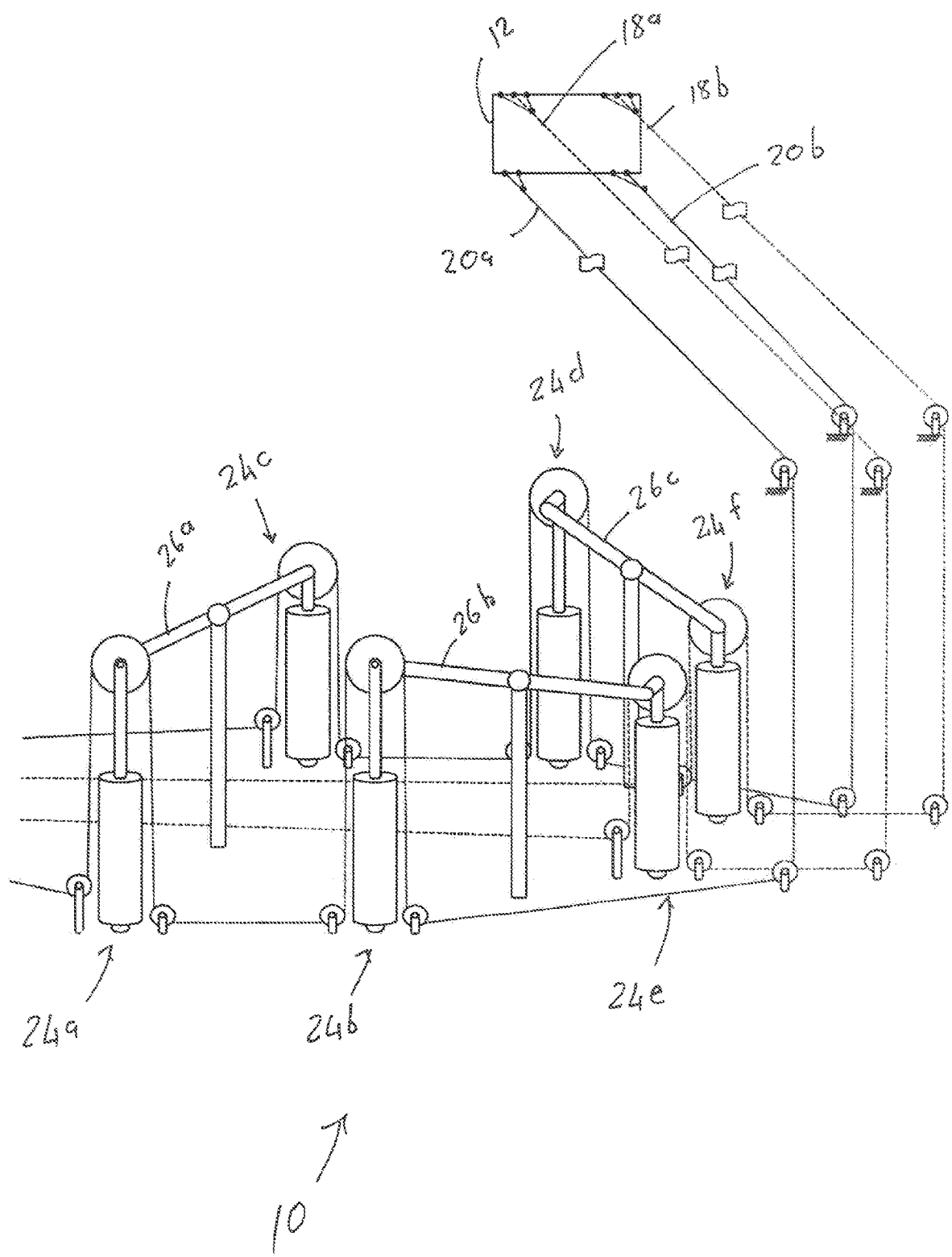
FIG. 13 shows the first embodiment of the invert correlator when in use.

FIGS. 12 and 13 illustrates a first embodiment of the invert correlator 28 for inversely correlating the degree of displacement between coupled deflector guides 26a and 26b of deflectors 24a and 24b, respectively.

In this embodiment the invert correlator takes the form of an invert correlator arm 46 which is pivotally supported about a mid region thereof by an invert correlator arm support 48, the invert correlator arm 46 further pivotally interconnected to the upper end regions of each of the pair of deflector shafts 38a and 38b. The deflector bases 36a and 36b are in the form of pressure chambers as shown, for allowing the regulation of pressure inside the chambers separate from one another.

In this embodiment each of the pair of the deflector bases 36a and 36b contains two pressure chambers each, a lower pressure chamber and an upper pressure chamber, located upper and below the chamber receiving portions 40a and 40b of each deflector shaft 38a and 38b, respectively.

By realising a different pressure differential between the upper and lower chambers of each base 36a and 36b through separate pressure regulators or flow regulating valves 42a and 42b for controlling the flow of liquid into, and out of each of the pressure chambers, the respective shafts 38a and 38b is displaced, and the degree of displacement is further inversely correlated by the pivotal supported invert correlator arm 46.

It is to be appreciated that the system as exemplified can also operate with one deflector base only so that the single deflector base is configured to displace both deflector shafts and the invert correlator would still work.

FIG. 13 illustrates the invert correlator 28 shown in FIG. 12, when in use, mechanically coupling a number of deflectors 24 by means of various invert correlator arms 46a, 46b and 46c, respectively, each in turn supported pivotally about a mid region thereof by its own invert correlator arm support 48.

Deflectors 24a and 24b are arranged in series and interconnected by trailing kite connecting line 20a. Deflectors 24c and 24d are similarly arranged in series and interconnected by trailing kite connecting line 20b. Deflector 24e is interconnected to leading kite line 18a and deflector 24f to leading kite connecting line 18b. Invert correlator arm 26a facilitates steering of the kite to the left or to the right by inversely correlating the adjustment of the operational length of trailing kite lines 20a and 20b respectively.

Interconnection of deflectors 24b and 24e by invert correlator arm 26b facilitate change of angle of attack, by simultaneously adjusting the operational length of trailing kite connecting line 20a and leading kite connecting line 18a. Similarly, interconnecting of deflectors 24d and 24f by invert correlator arm 26c will assist in manipulation of the angle of attack by simultaneously adjusting leading kite connecting line 18b, and trailing kite connecting line 20b.

Figure 14:
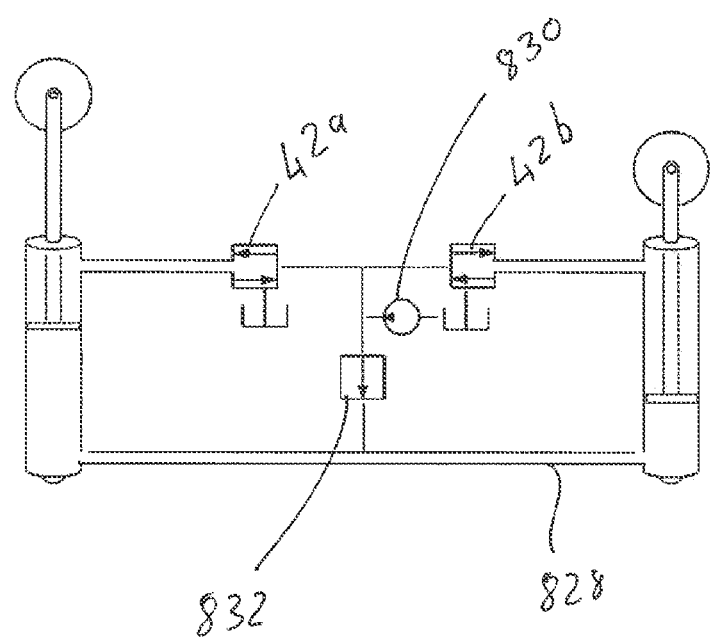
FIG. 14 shows a second embodiment of the invert correlator.
Figure 15:
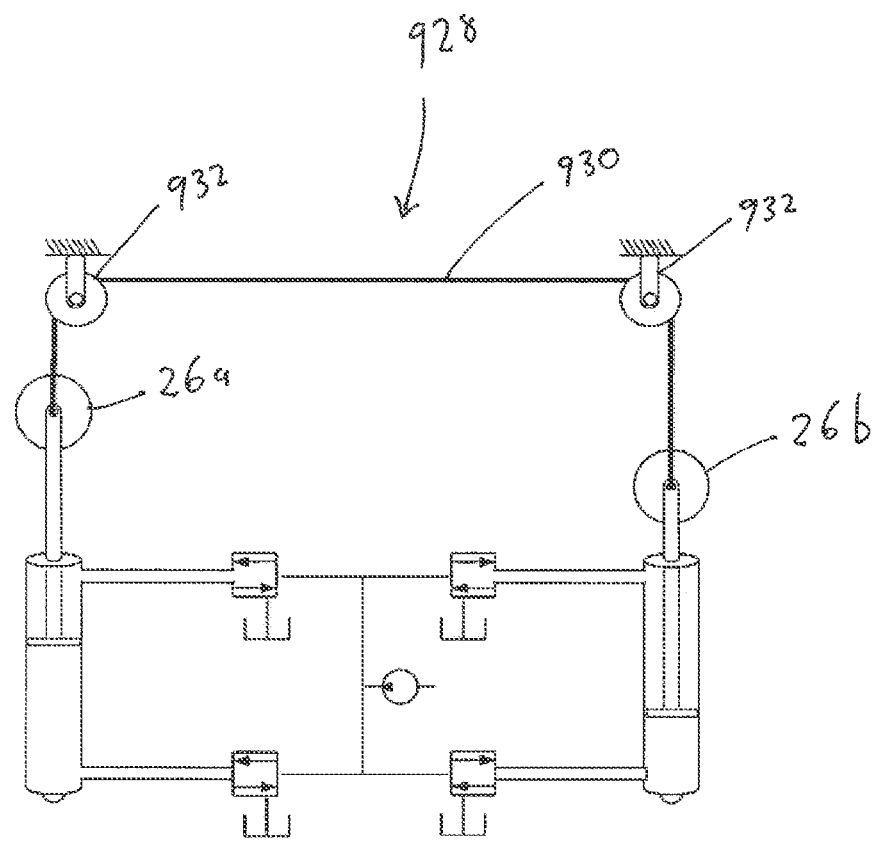
FIG. 15 shows a third embodiment of the invert correlator.

FIGS. 6, 7 and 14 show a second embodiment of the invert correlator in the form of a hydraulic coupling 828 for fluid flow coupling lower end pressure chambers of the respective deflector bases.

Separate pressure regulators, or flow regulating valves 42a and 42b, in fluid communication with upper chambers of the deflector bases regulates the pressure in the upper chambers while the hydraulic coupling 828 synchronises the degree of displacement between deflector shafts. The pump 830 in conjunction with valve 832 can pressurise the hydraulic coupling system.

FIGS. 5, 8, 9, 10, 15, and 23 show a third embodiment of the invert correlator 928 comprising a rope 930 and rope guiding arrangement 932, wherein the rope 930 interconnects coupled deflector guides and follows a guided path upper the two deflectors, so as to allow the rope 930 to inversely synchronise displacement of one deflector guide relative another deflector guide. The rope guiding arrangement 932 can be in the form of pulleys/and or sheave type elements mounted onto a surface upper the deflectors.

Figure 16:
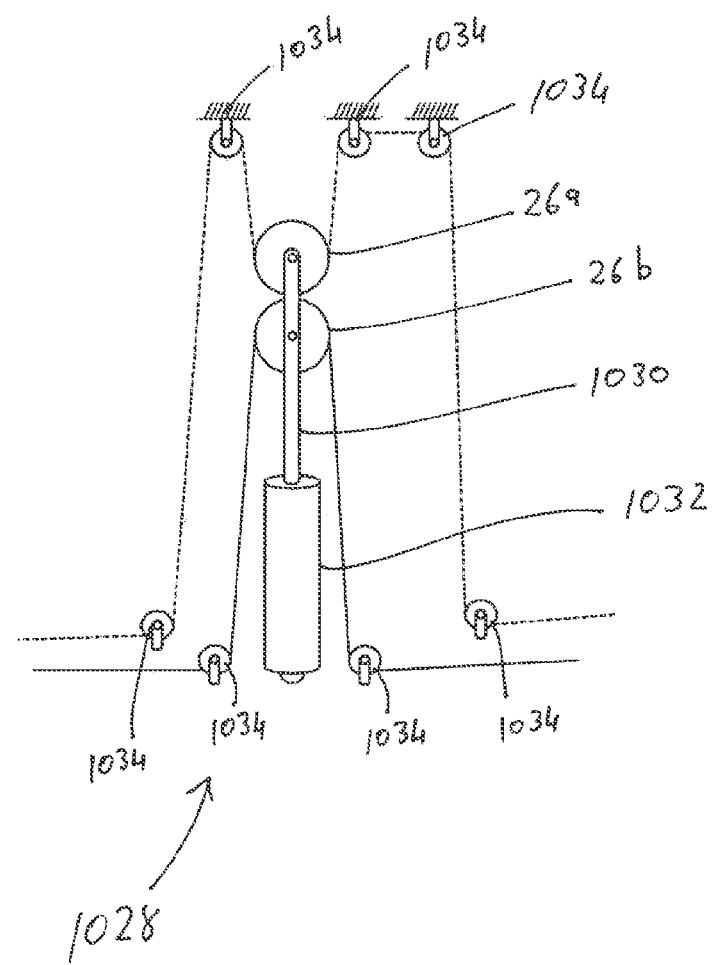
FIGS. 16 and 17 shows a fourth embodiment of the invert correlator.
Figure 17:
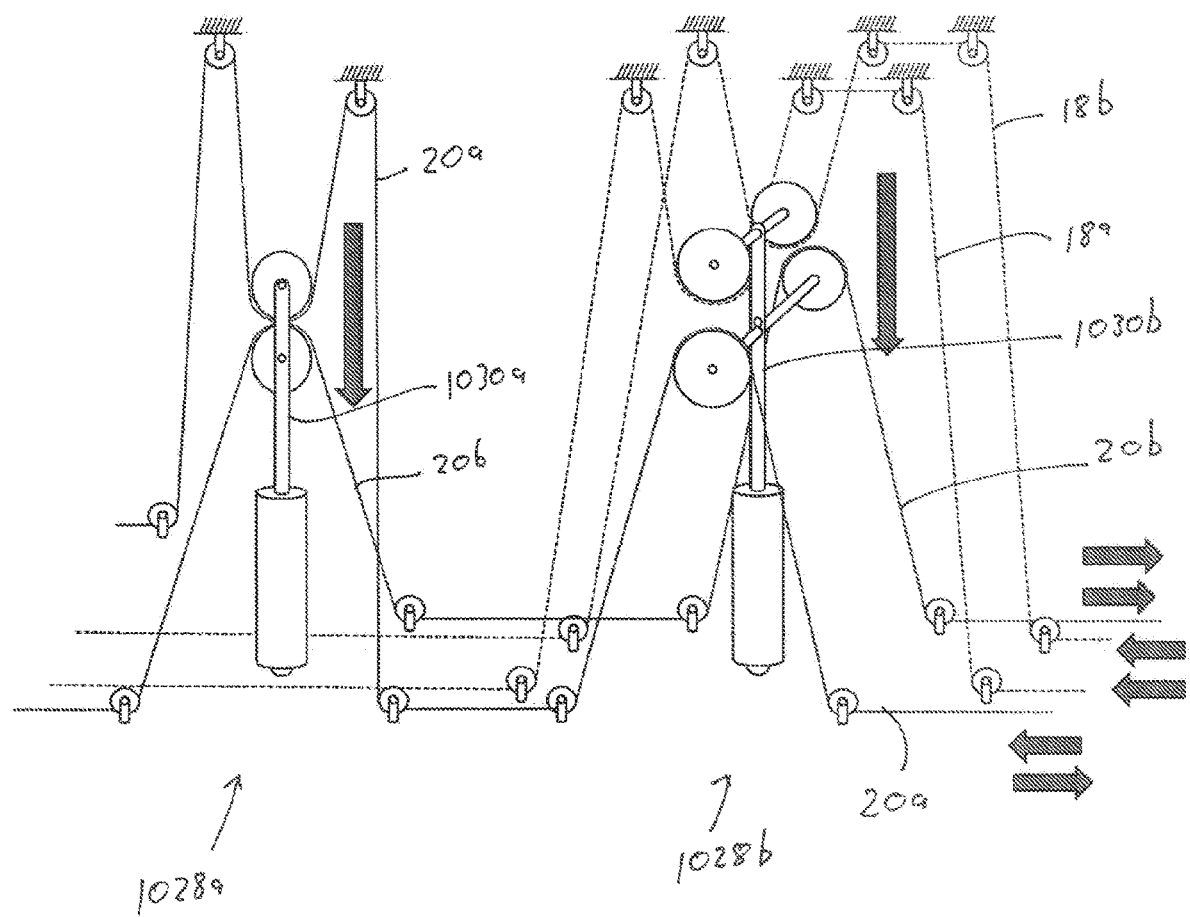

FIGS. 16 and 17 show a fourth embodiment of the invert correlator 1028 comprising a displaceable correlator coupling 1030 for interconnecting two deflector guides 26a and 26b in a spaced apart relationship on the correlator coupling 1030, each deflector guide having its own kite connecting line, 18a and 20a, extending therethrough, and wherein the respective kite connecting lines engage with the deflector guides 26a and 26b in regions facing one another. The invert correlator 1028 further includes a correlator displacer 1032 for co-axial and/or vertical displacement of the correlator coupling 1030. The invert correlator 1028 further includes a kite line arrangement 1034 for directing kite line 18a upper, and, kite line 20a lower the invert correlator 1028 for facilitating the engagement of the kite lines 18a and 20a with the deflector shafts 26a and 26b, in regions facing one another. Displacement of the correlator coupling 1030 upward will increase operational length of kite line 18*a*, while simultaneously decreasing operational length of kite line 20*a*.

In other words In this form, the invert correlator 1028 takes the form of two interconnected deflector guides 26*a* and 26*b*, operatively connected to one deflector shaft 1032, and through which different kite connecting lines 18*a* and 20*a* are extending therethrough, and which, upon the correlated adjustment of the deflector guides 26*a* and 26*b* into one direction, inversely correlate the adjustment of the operative length of the respective kite connecting lines 18*a* and 20*a*.

FIG. 17 in turn illustrates one possible setup for invert correlators 1028 shown in FIG. 16 when in use. Correlator 1028*a* inversely interconnects trailing kite lines 20*a* and 20*b*, while correlator 1028*b* interconnects leading kite lines 18*a* and 18*b* and trailing kite lines 20*a* and 20*b*. Displacement of correlator coupling 1030*a* in a downward direction will decrease operational length of trailing kite line 20*a*, while simultaneously increase the operational length of trailing kite line 20*b*. Displacement of correlator coupling 1030*b* in a downward direction will increase operational length of trailing kite lines 20*a* and 20*b*, while simultaneously decrease operational length of leading kite lines 18*a* and 18*b*.

As clearly illustrated, different embodiments of the invert correlator 28, 828, 928 and 1028 can be employed in the same kite control system in conjunction with different embodiments of the deflector 24, 124, 224, 324, 424, 524, 524, 624 and 724, which will be dictated by a user's specific requirements.

Figure 18:
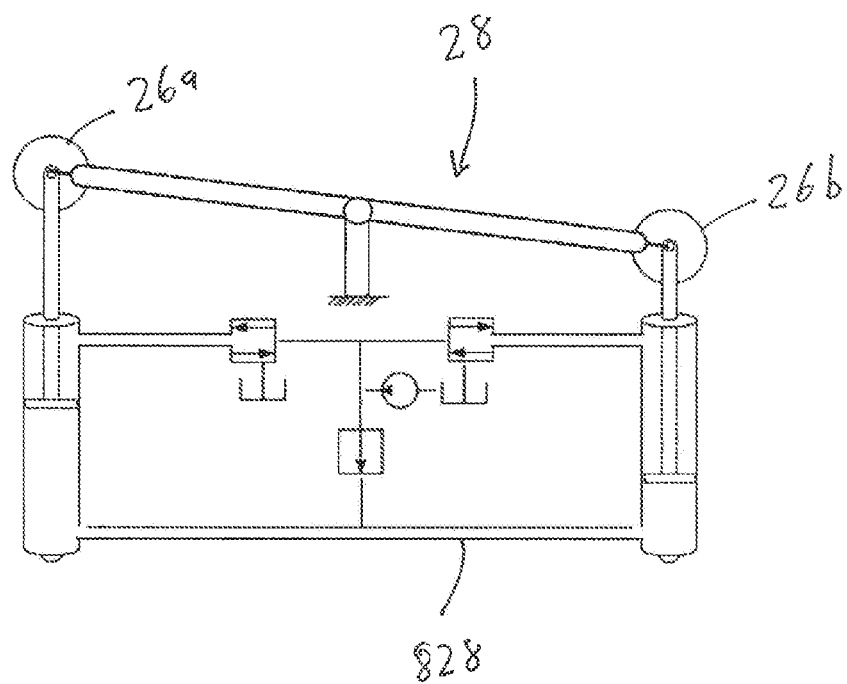
FIG. 18 shows a combination of the first and second embodiments of the invert correlator.
Figure 19:
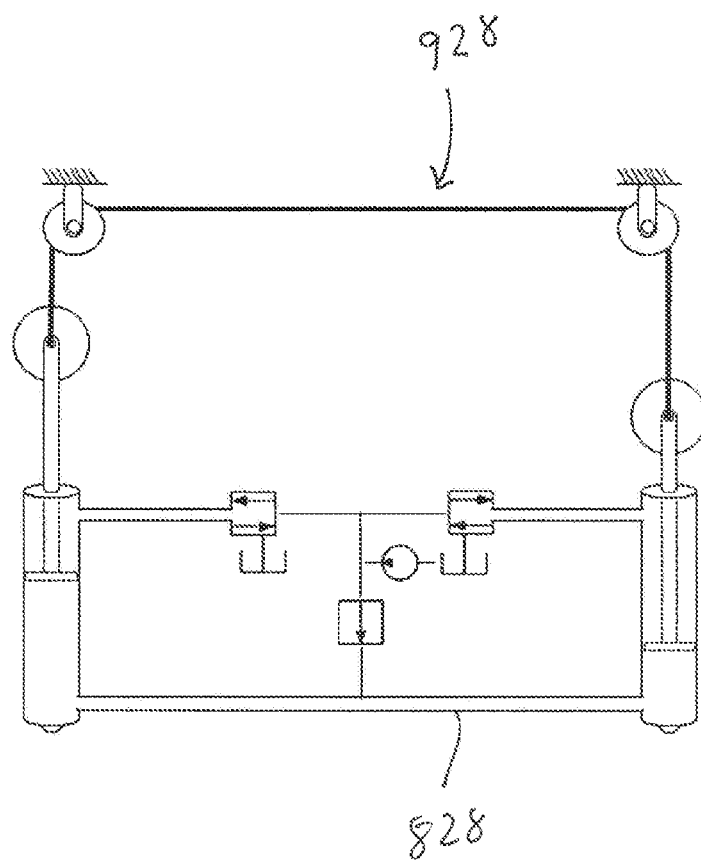
FIG. 19 shows a combination of the second and third embodiments of the invert correlator.

For example, FIG. 18 illustrates the combination of invert correlator 28 and 828, in use, for operatively coupling deflector guides 26*a* and 26*b*.

FIGS. 19, 20, 21, 22 and 24 illustrates the combination of invert correlators 828 and 928, in use.

Figure 20:
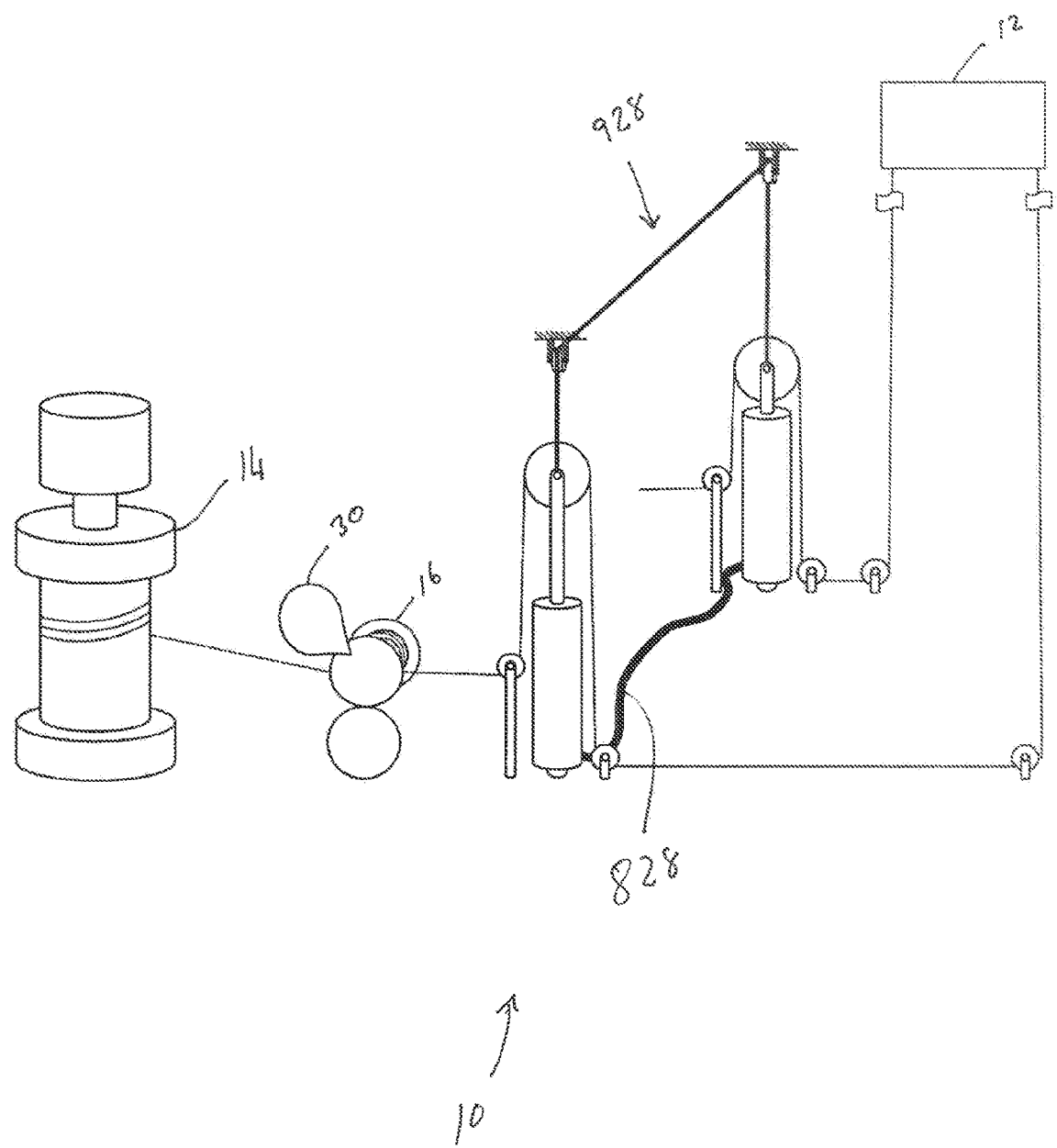
FIG. 20 is a schematic illustration of the second and third embodiments of the invert correlator, when in use.

FIG. 20 shows the combination of embodiments 828 and 928 of the invert correlator when in use. The reel type element 14 and winch type element 16 being motorised, winch 16 further including a brake mechanism 30. Both reel type element 14 and winch type element 16 could be connected to a generator.

FIG. 21 further shows a preferred configuration of coupling of the deflectors 24 where a single leading kite connecting line 18 is used. Single kite connecting line 18 is further connected at various preferred leading end and central regions of the kite 12. The kite connecting lines 20*a* and 20*b* are further connected at various preferred opposing trailing end and central regions of the kite 12. Deflectors 24*a* and 24*b* both deflect trailing kite connecting line 20*a*. Deflectors 24*c* and 24*d* both deflect trailing kite connecting line 20*b*, and deflector 24*e* deflect leading kite connecting line 18. In order to change the angle of attack of the kite 12, deflector 24*e* is coupled by invert correlators 928*b* and 928*c* to both deflectors 24*b* and 24*d*, respectively in order to simultaneously adjust the leading kite connecting line 18 and trailing kite connecting lines 20*a* and 20*b*. Invert correlator 928*a* in turn couples deflectors 24*a* and 24*c* for steering the kite to the left, or, the right.

Figure 22:
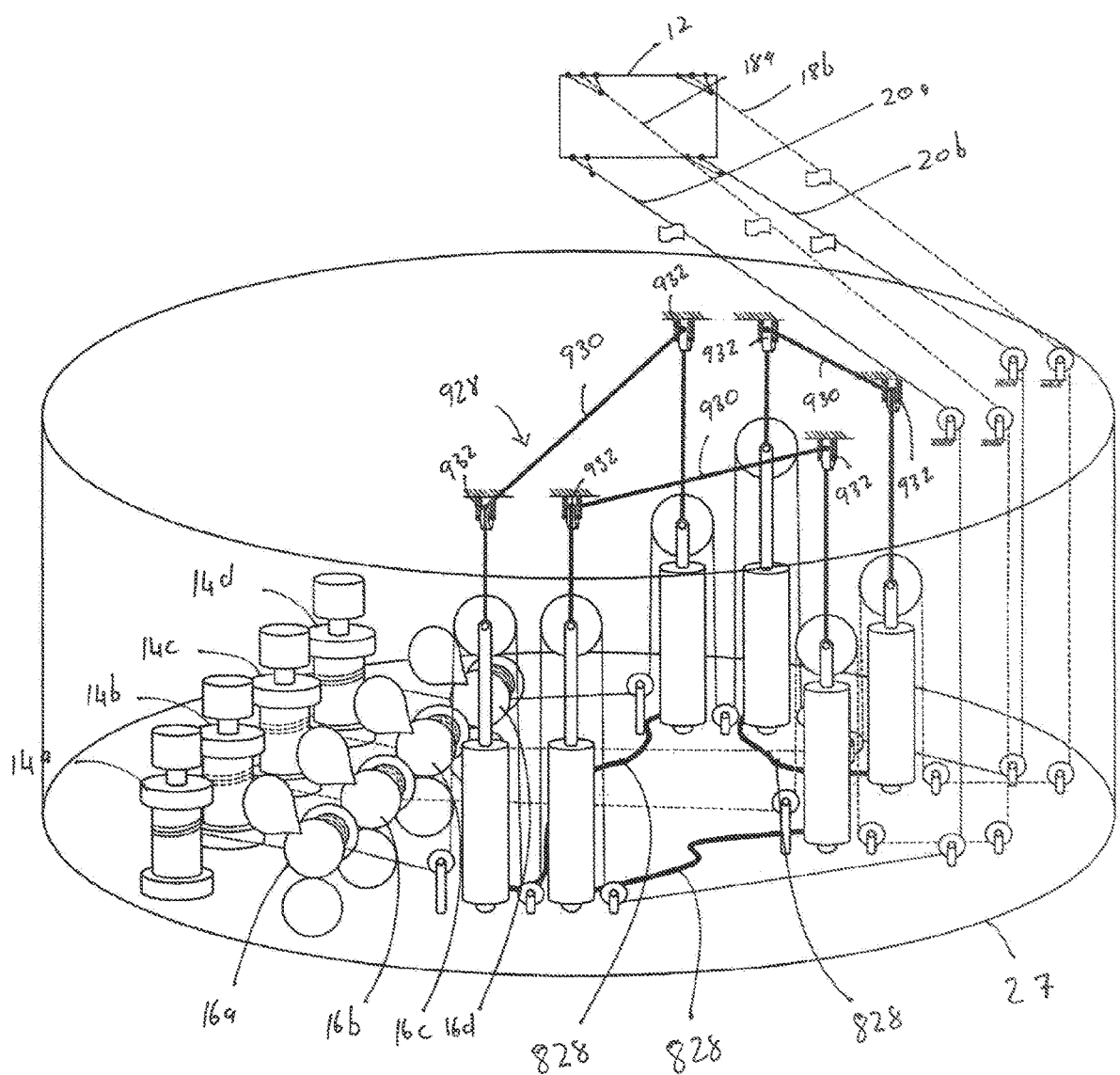
FIG. 22 is a further schematic illustration of the second and third embodiments of the invert correlator, when in use

FIG. 22 shows another possible configuration of interconnected deflectors 24 by the combination of embodiments of the invert correlator 928 in the form of a rope 930, rope guiding arrangement 932, and, hydraulic coupling 828, respectively. Also shown are the reel type elements 14*a*, 14*b*, 14*c* and 14*d* as well as winches 16*a*, 16*b*, 16*c* and 16*d*, mounted onto a rotatable platform 27.

Major operational adjustment or relatively lasting trimming of trailing kite connecting line 20*a* will be facilitated by rotation of either or both 14*a* and 16*a*, while minor and perpetual steering necessitated by adjustment of trailing kite connecting line 20*a* will be facilitated by deflectors 24*a* and 24*b*, deflecting the kite line as needed thereby shortening or lengthening the line. Same operational method will be applied for all the other deflectors, winch type elements, and reels, as shown.

Figure 23:
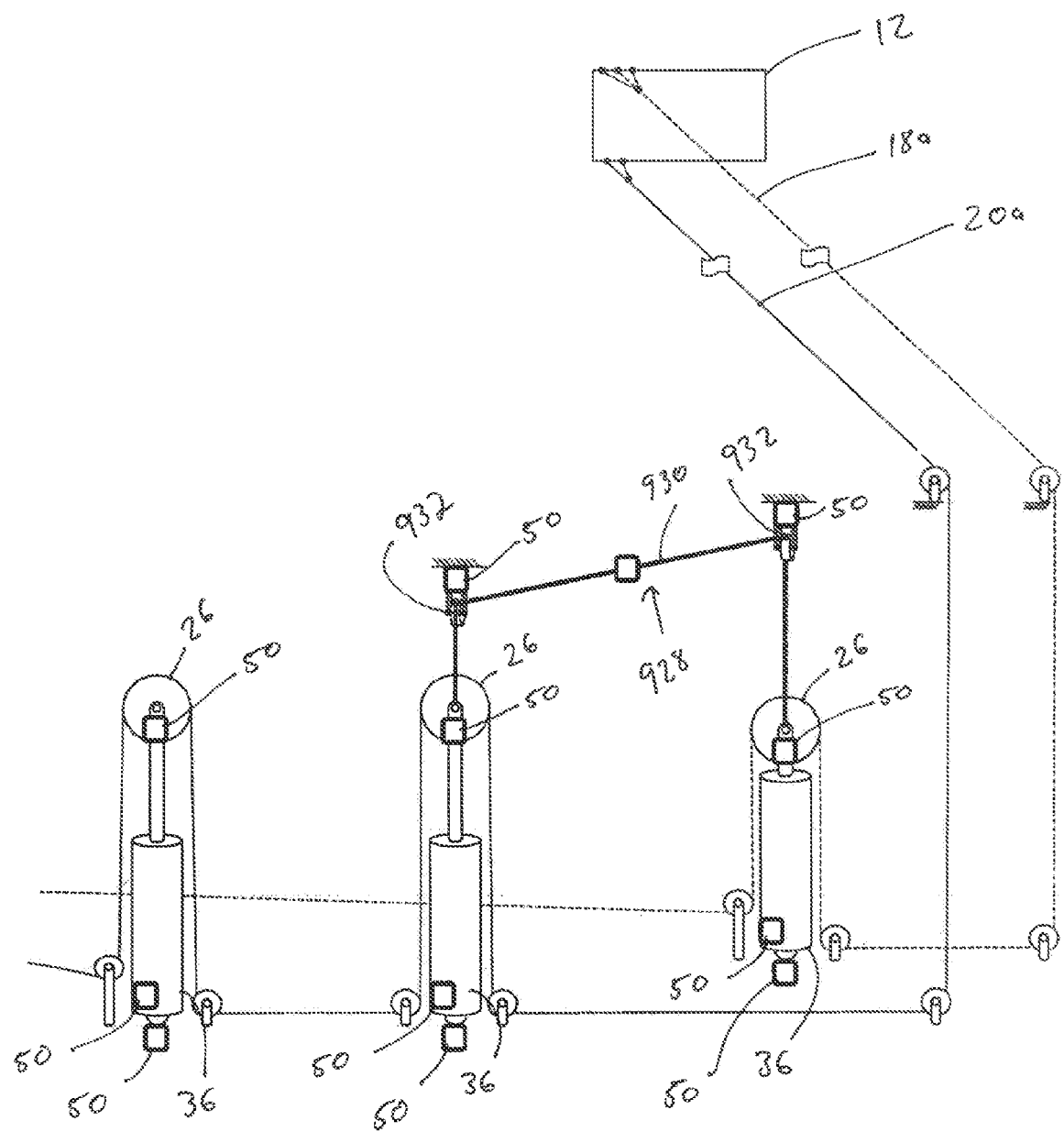
FIG. 23 is a schematic illustration depicting possible locations for mounting the tension sensor.

FIG. 23 shows where sensors measuring tension and/or pressure and/or force and communicating the detected tension measurements of at least one of the plurality of kite connecting lines at various locations thereof would be located. The sensors 50 can be mounted about the deflector base 36, for measuring the pressure inside the base 36 as a result of a downward force exerted on deflector shaft 38 when the kite 12 pulls the kite connecting lines 18*a* and 20*b*. Similarly, the sensors 50 can be located at the mounting of deflector base 36, for measuring the downward pressure exerted on deflector shaft 38 (or upward pressure, in case the deflector is mounted extending downward, and configured to shorten the kite connecting line "on pull", as described in FIG. 11). Similarly, these sensors can be located about the deflector guide 26, or underneath the deflector base 36. Further, the pressure and/or tension sensors can be mounted at the rope guiding arrangement 932, or inserted in rope 930, by cutting open rope 930 into two segments, for measuring and communicate tension on rope 930. The deflectors 24 can further be equipped with displacement sensors to detect and communicate the degree of displacement of the deflector shaft 38 relative the deflector base 36.

Figure 24:
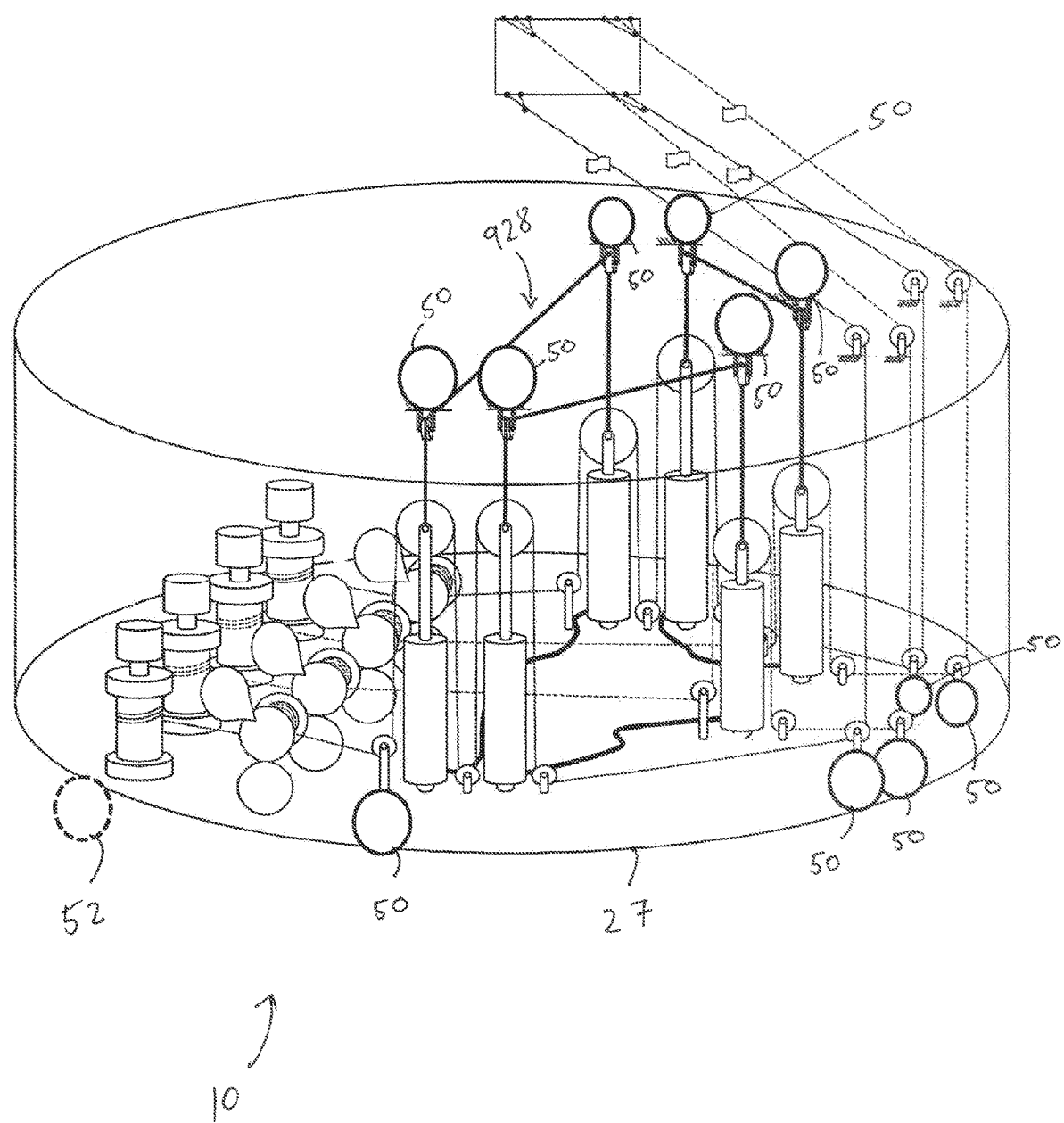
FIG. 24 is a further schematic illustrating possible locations for mounting the tension sensors, as well as the positioning sensor.

FIG. 24 is an equivalent to FIG. 22 but for the inclusion of the pressure or tension sensors 50 and the positioning sensor 52. The positioning sensor 52 mounted about the rotatable platform 27 allows a user to detect the rotational orientation of the platform relative the watercraft or vehicle or base, while the tensions sensors 50 will measure and communicate the tension or pressure forces experienced at various locations as depicted. The positioning sensors 52 can also be located at the guiding elements 22, where the guiding elements 22 are located before the lines lead to the kite 12, to measure and communicate the horizontal position of the kite connecting lines in space.

The system can also further also include an optical force sensor, where a camera inspects the surface of the kite connecting lines and detect and measures the tension forces on the kite connecting lines by measuring the degree of stretch in the kite connecting line.

Further the rotators may be equipped with a sensor configured to measure the tension forces on the kite connecting lines (not shown).

Further the rotators may be equipped with a sensor configured to measure the operational length of its corresponding kite connecting line as reeled out.

These measurements will typically be communicated to a central computer and or control system.

Figure 25:
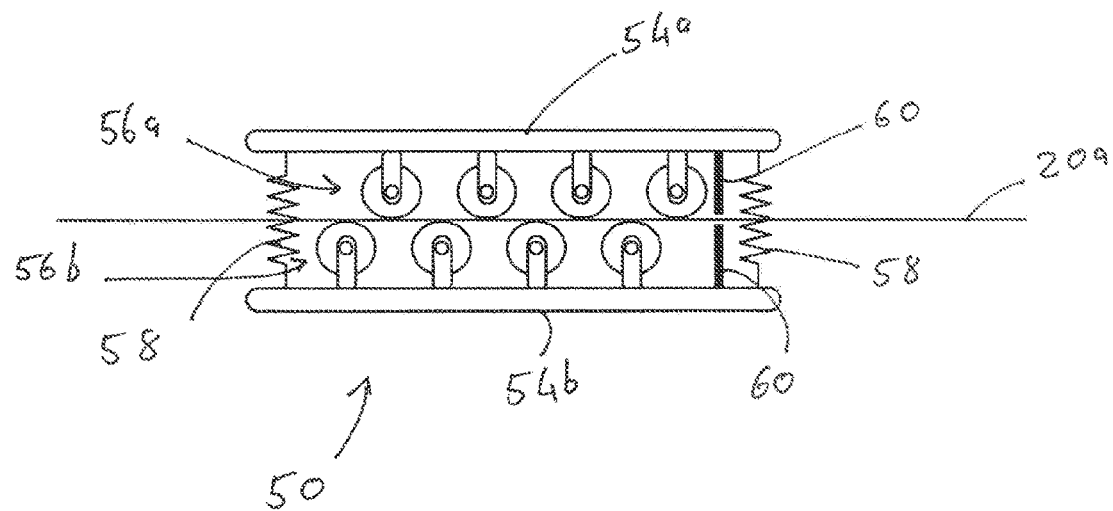
FIGS. 25 and 26 are schematics illustrating one embodiment of the tension sensor.
Figure 26:
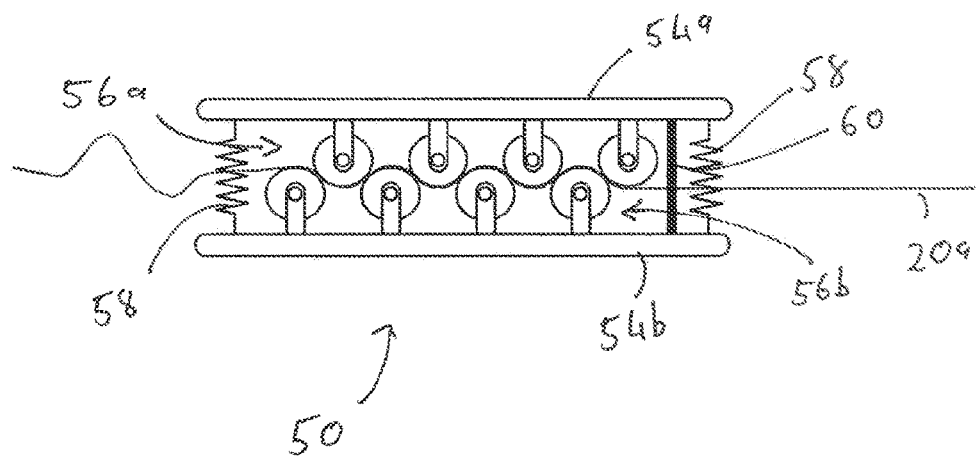
Figure 27:
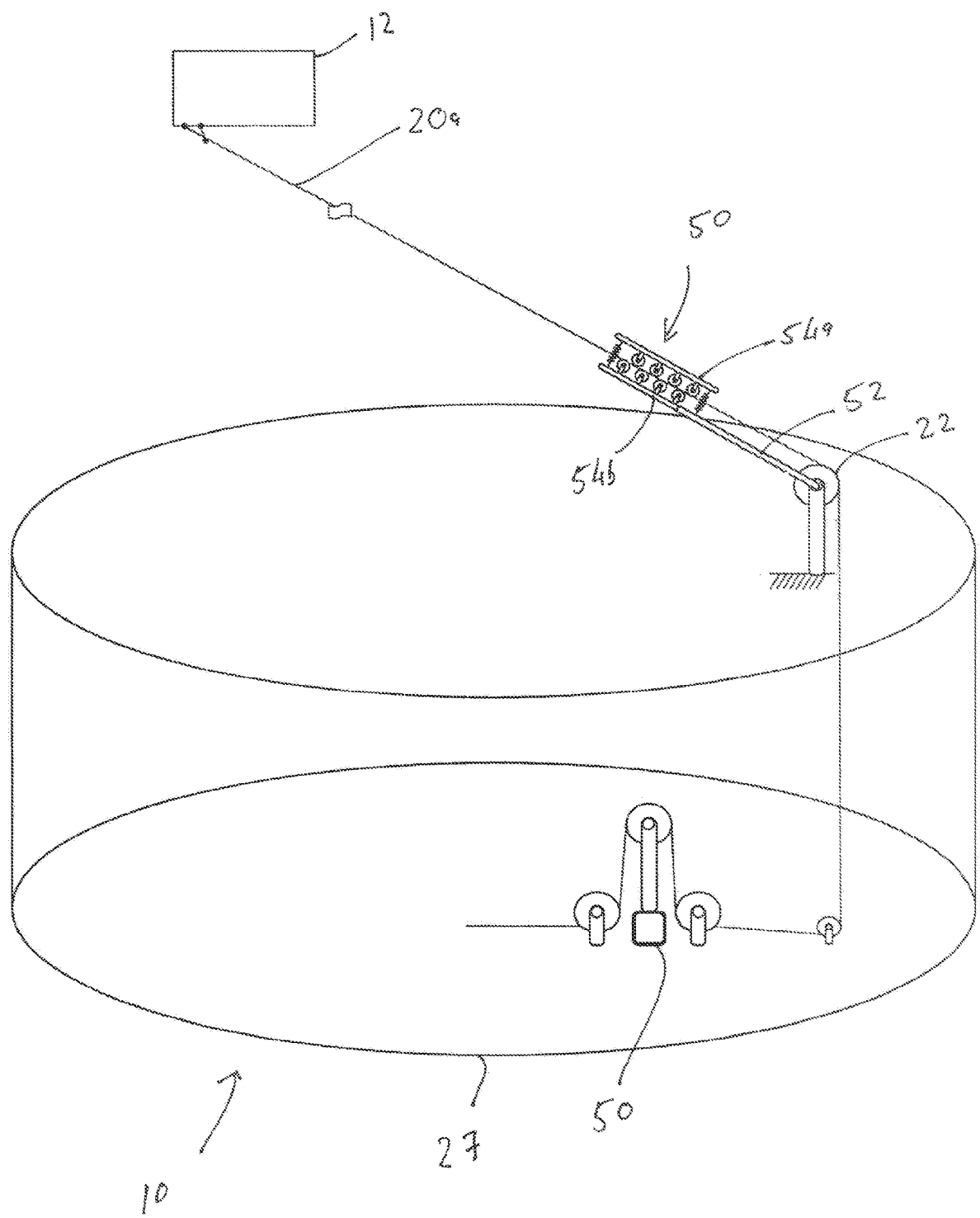
FIG. 27 is a schematic illustrating a combined positioning and tension sensor.

Turning to FIGS. 25 to 27, one embodiment of the tension sensor 50 is depicted, specifically adapted for measuring the tension in a kite connecting line, for example the trailing kite connecting line 20*a*.

The tension sensor 50 can be mounted about a guide element 22 (FIG. 27) and includes a pair of plates 54*a* and 54*b*, displaceably interconnected to one another at opposing regions thereof, each plate 54*a* and 54*b* further including a row of pulleys 56*a* and 56*b*, arranged in line and in a spaced apart relationship, one row of pulleys facing the other, with the kite line 20*a* extending between the two rows of pulleys 56a and 56b, and longitudinally the sensor 50. The pair of plates 54a and 54b is further biased towards one another by coiled springs 58 interconnecting the plates 54a and 54b at opposing end regions thereof. The sensor 50 further includes a displacement sensor in the form of a pair of rods 60 extending from the inner plate surfaces 54a and 54b towards one another for measuring relative distance between the plates.

Tensioning of the kite connecting line 20a extending therethrough will cause the kite connecting line to push away the pulleys aligned on either side thereof, thereby displacing the plates and the rods 60 away from one another, more clearly shown in FIG. 25.

Similarly, see FIG. 26, when tension is low, the two rows of pulleys will be biased towards one another due to the lack of tensioning in the kite line 20a to push the pulleys and thereby the plates away from one another and the rods will connect and their end regions, and signalling a low tension and/or slack in the kite line 20a.

In FIG. 27, the vertical angle of positioning sensor 52 extending from guiding element 22 shall be measured and communicated to a central control system, to obtain an indication of the position and direction of movement of the kite 12.

Further, FIG. 27 shows location of the pressure sensor 50 at the guiding element for measuring the downward pressure exerted by the kite connecting line 20a. The sensor result will give an indication of the tension on the kite connecting line 20a and it can be communicated to a central control system.

Figure 28:
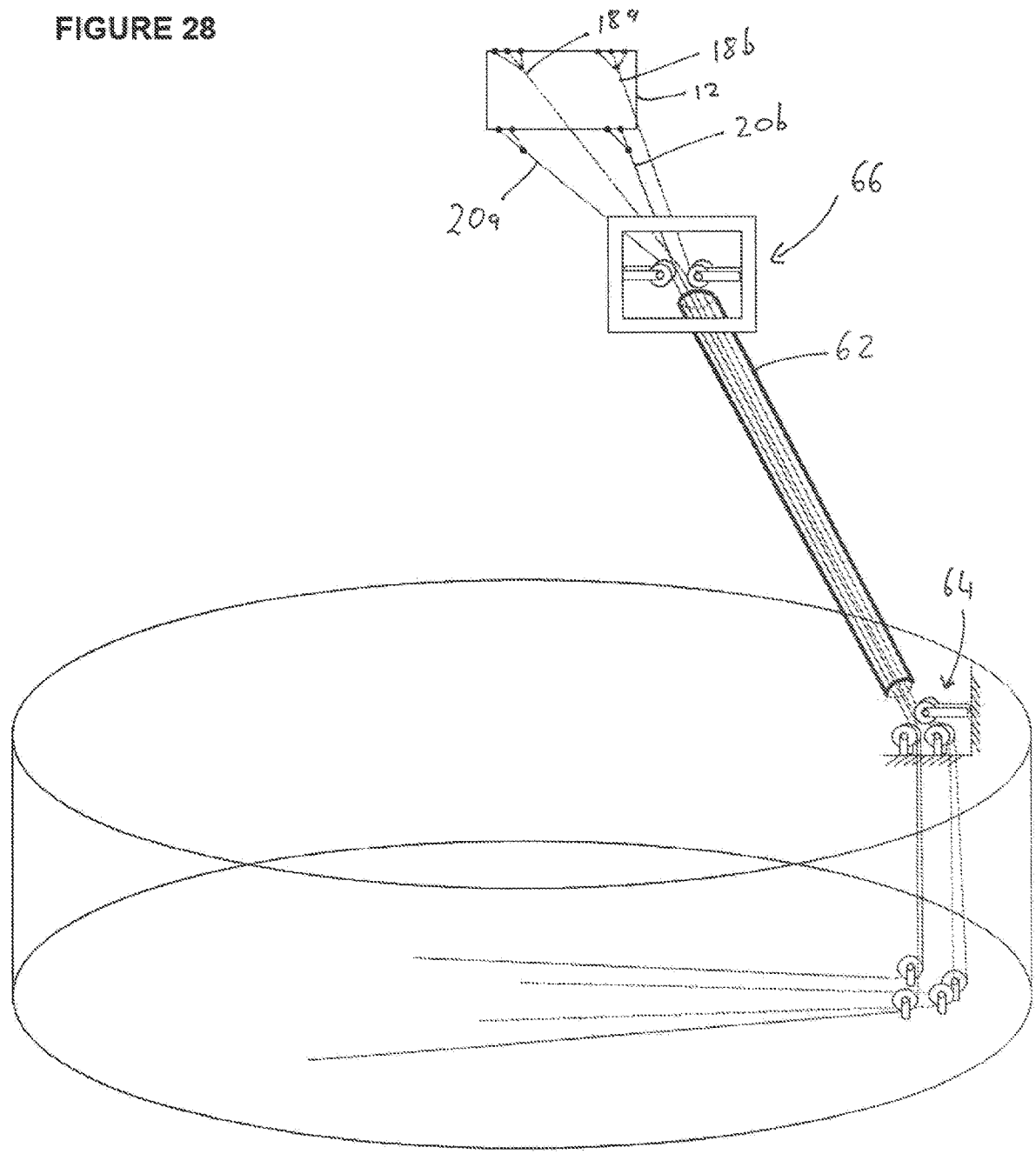
FIGS. 28 and 29 are schematic illustrations of the sheath and guide arrangement mounted about the kite connecting lines; in accordance with the invention.

Turning to FIG. 28, in order to improve the controllability and efficacy of the kite connecting lines, and thereby the kite 12, a sheath 62 and guide arrangement mountable about the kite connecting lines is provided for constraining kite connecting lines 18a, 18b, 20a and 20b, wherein the guide arrangement includes an input guide 64 for directing the kite connecting lines towards one another and guiding the kite connecting lines into the sheath 62, and an output guide 66 for keeping the kite connecting lines towards one another just after the sheath and for guiding the kite connecting lines in a spaced apart manner from the sheath 62 towards the kite, respectively. The sheath 62 improves aerodynamic properties of the kite lines, reduce slack, improve the responsiveness of the kite to the kite control input, and improves synchronising the control input by aligning the sag of the kite connecting lines, and thereby improve controllability of the kite 12.

FIG. 29 shows the output guide 66 including a mounting arrangement 68 for mounting the output guide 66 on the kite connecting lines to support output guide 66 and to prevent it from moving downwards.

The elements of the output guide 66 are mounted at a support frame 70. The guide elements and/or the support frame 70 are connected to the kite connecting lines by mounting arrangement 68, to prevent it from moving downwards, away from the kite, and, as shown in FIG. 28, at the upper surface, to prevent it from moving upwards, away from the upper surface.

There are several advantages of having the kite control system separate and away from the kite, on the ground, or on board of the watercraft or a vehicle itself, as opposed to having them inside a gondola or a kite-steering-unit up in the air, suspended underneath the wing.

First and foremost, a user does not have to suspend the system up into the air, and therefore lightweight construction is much less important. Consequently, more solid, stronger and more reliable designs can be applied for controlling the kite, particularly when one attempts to scale the kite to large sizes, resulting in very high traction forces.

Secondly, more robust, redundant and fail-safe architectures can be applied when the kite control system is on the ground or on board, due to weight playing a much lesser role.

Thirdly, no remote control to the gondola and/or kite is required. One does not need to transfer the required energy to the gondola and/or kite, for effecting the steering forces, either for instance via a cable or via a battery or with a generator inside the gondola, and there is no need to transfer the steering signals to the gondola, either through a wire or wireless. As a result, when having the kite control system on the ground, it is less likely to fail than a remote-controlled gondola.

Fourthly, the gondola or the kite steering unit cannot fall into the water or fall onto the ground.

Fifthly, experimentation with differently shaped kites, different kite sizes, or kite materials is much easier, when the kite control actuators are placed on the ground or on board of a ship, because one does not have to adapt the "gondola" and its steering mechanisms to the specific geometry of the wing or to its size, but rather one can control the wing by means of two, three or four (or more) ropes, steering the wing through length adjustments of these ropes, while adjusted and controlled from the ground.

The invention disclosed further obviates high demands on the winches, e.g. regarding the forces the winches need to handle, or their precision, their speed or their level of synchronization.

Standard winches with lower specifications can be used, smaller or less precise or slower winches can be used, or even only one winch for all kite connecting lines can be used, which rolls up the lines on separate coils, but driven by only one motor.

The winches do not need to be able to control, to handle and to constantly adjust the length of the kite connecting lines, while the kite is in full load operation mode, i.e. while the full forces act on the ropes during maximum traction generation by an actively flown and fully powered kite. But rather the winches only need to be able to handle reeling-out or reeling-in the ropes, possibly also trimming tasks, during times while the kite is in low load operation mode, i.e. de-powered and/or not actively flown, exerting much lower forces on the ropes.

During full load operation, instead, the deflectors, may these be driven either hydraulic, pneumatic, mechanic or electric in nature, can take over the manipulation of the lengths of the ropes. The winch or winches are only in brake-mode during these times, i.e. they either need to only exert holding forces on the ropes, with a break or by a second winch with a break or equipped with a worm gear, which allows an almost force-less holding of the rope by the first winch(es), or by other means to allow for low-force roll-up of the ropes on the first winch(es). Alternatively, or in addition, the ropes may be held before the winches by a suitable mechanism, e.g. with clamps. Even if generators are connected to the winches, these can unreel the kite connecting lines, while generating electricity, while the deflectors effect the control of the kite.

The present invention allows to handle even higher forces on the ropes, allowing therefore for even higher wind speeds, or allowing for even larger kites, towing for instance large ships or driving large generators. If the size of the kite increases, or if the wind speed increases, the forces on the ropes increase, too. With this the forces on the deflectors to manipulate the relative length of the kite connecting lines will increase, too. This may cause problems, also because at least the kite connecting lines to the trailing end of the kite need to be constantly manipulated by their deflectors during the flight. If the deflectors need to handle the full force on the ropes, this may result in a high energy demand, in large deflector dimensions, or even in materials fatigue over time.

By a specific routing of the ropes from the winches via guiding elements and deflector elements, which can be inversely correlated with each other, the present invention allows to handle even higher forces on the ropes, and therefore even larger wings or kites, towing for instance large ships or driving large generators. The invention also allows to handle higher wind speeds and hence the harvesting of more power.

The inventor believes that with this type of kite control arrangement very large kites can be controlled in an effective and efficient manner especially where utilised for propelling large ships, or vehicles, or electric generators with maximum power output.

These ships can be used for electricity production, converting the traction forces of the kite into electrical energy with the traction forces propelling the onboard generator(s), or with underwater generators connected to hydrokinetic ship mounted turbines. The electrical energy can be used to manufacture hydrogen, or to store it in any form of energy, for example methane gas, synthetic crude oil, ammonia, formic acid, or any other suitable substance, based on hydrogen with the aim to store electricity (so-called E-Fuels or Power Fuels, produced by power-to-X technologies). By exercising the invention, the power output and economy of these ships will be maximized. In this sense the invention can form the basis for economic production of synthetic fuels or synthetic feedstock to replace fossil fuels and to fight climate change.

It shall be understood that the examples are provided for illustrating the invention further and to assist a person skilled in the art with understanding the invention and are not meant to be construed as unduly limiting the reasonable scope of the invention.

The invention claimed is:

1. A system comprising:
   (I) a kite; and
   (II) a kite control subsystem for controlling the kite, the kite control subsystem including:
   (i) a plurality of rotators interconnectable to one or more of a plurality of kite connecting lines, which are connected to the kite, for adjusting the operative length of the one or more kite connecting lines upon rotation thereof, when in use;
   (ii) a plurality of guiding elements locatable between each of the plurality of rotators and the kite for guiding and defining a kite line path for each of the plurality of kite connecting lines from the rotators towards the kite;
   (iii) a plurality of adjustable deflectors, at least one of the plurality of adjustable deflectors being locatable inbetween at least one of the plurality of rotators and the kite;
   (iv) a plurality of deflector guides, each of which is operatively connected to at least one of the plurality of deflectors, and having at least one of the plurality of kite connecting lines extending therethrough, and further being configured to adjust the operative length of the at least one of the plurality of kite connecting lines, upon adjustment of the deflector so as to cause the deflector guide to angularly deflect a portion of the at least one of the plurality of kite connecting lines, when in use; and
   (v) at least one invert correlator, operatively interconnectable to at least two of the plurality of deflector guides for, when in use, inversely correlate the adjustment of the operative length of the respective kite connecting lines;
   wherein the connection of at least one of the plurality of kite connecting lines; the kite is biased towards the leading end region of the kite and the connection of at least one other kite connecting line is biased towards the trailing end region of the kite, said connections thereby allowing control of the angle of attack of the kite in the air by adjustment of at least one of the deflectors.

2. The system as claimed in claim 1 which includes a support surface in the form of a rotatable platform for supporting the kite control subsystem.

3. The system as claimed in claim 2 wherein at least one of the plurality of guiding elements is pivotally connected to the support surface.

4. The system as claimed in claim 2 which includes a positioning sensor for measuring and communicating degree of rotation of at least one of the plurality of guiding elements relative to the support surface.

5. The system as claimed in claim 1 wherein the plurality of rotators includes a set of rotators arranged in line and/or sequence with one another and interconnected by the same kite connecting line extending thereinbetween.

6. The system as claimed in claim 1 wherein at least one of the plurality of rotators is connected to a generator, to generate electricity when the one or more of a plurality of kite connecting lines interconnected thereto is reeled out by the pull of the kite.

7. The system as claimed in claim 1 wherein at least one of the plurality of adjustable deflectors is longitudinally adjustable and includes a deflector base and a deflector shaft, the deflector shaft operatively connected to the deflector base in a longitudinally adjustable relationship relative thereto.

8. The system as claimed in claim 7 wherein the deflector shaft further includes the deflector guide mounted rotatably onto an upper end portion of the deflector shaft away from the deflector base for rotatably accommodating the at least one kite connecting line extending therethrough.

9. The system as claimed in claim 8 wherein a pair of longitudinally adjustable deflectors is arranged in a side by side manner, with the at least one invert correlator operably connected to deflector guides of each of the pair of longitudinally adjustable deflectors for inversely correlating the degree of adjustment of one deflector shaft of one longitudinally adjustable deflector relative to the other coupled deflector shaft of the second longitudinally adjustable deflector upon movement of the at least one invert correlator so as to simultaneously cause the operative length of one kite connecting line, which extends through one of the pair of longitudinally adjustable deflectors, to increase to the same extent as the other kite connecting line, which extends through the other of the pair of longitudinally adjustable deflectors, retracts.

10. The system as claimed in claim 7 wherein the deflector shaft includes a plurality of deflector guides mounted rotatably in a vertically spaced apart relationship on the deflector shaft.

11. The system as claimed in claim 7 wherein the deflector base includes a pressure chamber for containing liquid and/or gas under pressure, the deflector shaft operably connected in fluid communication with the pressure chamber so that displacement of the deflector shaft relative the pressure chamber is achieved by regulating the pressure inside the pressure chamber.

12. The system as claimed in claim 7 wherein the deflector base includes a pair of pressure chambers defined therein, the deflector shaft terminating in a chamber receiving portion and located inside the deflector base, with each of the pair of pressure chambers located on opposing sides of the chamber receiving portion, wherein displacement of the chamber receiving portion, and thereby the deflector shaft is facilitated by creating a pressure differential between the pair of pressure chambers defined on opposing sides of the chamber receiving portion.

13. The system as claimed in claim 7 wherein at least one of the adjustable deflectors includes an electric motor for driving displacement of the deflector shaft relative the deflector base.

14. The system as claimed in claim 7 wherein two or more of the plurality of longitudinally adjustable deflectors are arranged in series and interconnected by the same kite connecting line extending thereinbetween.

15. The system as claimed in claim 7 wherein a pair of longitudinally adjustable deflectors is arranged in a side by side manner, the invert correlator including a hydraulic coupling and valve arrangement in fluid communication with pressure chambers of coupled deflector bases for correlating the pressure inside the coupled pressure chambers and/or inversely correlating the volume of liquid or gas in coupled pressure chambers.

16. The system as claimed in claim 7 which includes at least one tension sensor operatively located about the plurality of deflector guides for measuring the downward pressure exerted on the deflector shaft by the at least one of the plurality of kite connecting lines extending through the said deflector guide.

17. The system as claimed in claim 7 which includes a displacement sensor for measuring and communicating the degree of displacement of the deflector shaft relative the deflector base.

18. The system as claimed in claim 1 wherein the at least one invert correlator correlates the inverse adjustment of the operative length of at least one of the plurality of kite connecting lines, and, operative length of at least one other of the plurality of kite connecting lines, relative to one another.

19. The system as claimed in claim 1 wherein the invert correlator includes a rope, and, rope guiding arrangement, wherein opposing end regions of the rope are connected to the respective deflector guides, the rope guiding arrangement defining a guided tensioned path for the rope.

20. The system as claimed in claim 1 which includes at least two interconnected deflector guides operatively connected to the same correlator coupling, each deflector guide having its own kite connecting line extending therethrough, and which, upon the correlated adjustment of the deflector guides in the same direction, inversely correlate the adjustment of the operative length of the respective kite connecting lines, when in use.

21. The system as claimed in claim 1 wherein at least one tension sensor is operably connected to the plurality of rotators, for measuring and communicating the pulling force exerted on the said rotator by the one or more of the plurality of kite connecting lines extending therefrom.

22. The system as claimed in claim 1 which includes a tension sensor for measuring tension exerted by the kite on one or more of the plurality of kite connecting lines, the tension sensor further including a pair of plates displaceably interconnected to one another at opposing regions thereof, each plate further including a row of pulleys arranged in a spaced apart relationship on inner surfaces of the plates, one row of pulleys facing the other with one or more of the plurality of kite connecting lines extending between the two rows of pulleys and longitudinally the sensor, a biasing member for biasing the plates towards one another, and, a displacement sensor for detecting displacement of the plates relative one another.

23. The system as claimed in claim 1 which includes a positioning sensor for measuring and communicating the position of one or more of the plurality of kite connecting lines in space.

24. The system as claimed in claim 1 which includes an optical sensor for measuring and communicating degree of stretch in one or more of the plurality of kite connecting lines, as a result of the tension exerted on one or more of the plurality of kite connecting lines.

25. The system as claimed in claim 1 which includes a sheath and a guide arrangement mountable about at least two of the kite connecting lines for constraining at the kite connecting lines, wherein the guide arrangement includes an input guide for guiding the at least two kite connecting lines into the sheath, and, an output guide to keep the lines together just after the sheath and for guiding the at least two kite connecting lines in a spaced apart manner from the sheath towards the kite, respectively.

26. The system as claimed in claim 25 wherein each of the input and/or output guide includes its own mounting arrangement for mounting the input and/or output guide on the kite connecting lines.

* * * * *